United States Patent
Crayford

Patent Number: 5,432,775
Date of Patent: Jul. 11, 1995

[54] AUTO NEGOTIATION SYSTEM FOR A COMMUNICATIONS NETWORK

[75] Inventor: Ian S. Crayford, San Jose, Calif.

[73] Assignee: Advanced Micro Devices, Inc., Sunnyvale, Calif.

[21] Appl. No.: 161,707

[22] Filed: Dec. 3, 1993

[51] Int. Cl.⁶ .................................................. H04J 3/02
[52] U.S. Cl. ........................................ 370/10; 370/14; 370/31; 370/85.3; 375/239
[58] Field of Search ............... 370/24, 31, 85.2, 85.3, 370/10, 13, 14; 375/23; 307/234

[56] References Cited

U.S. PATENT DOCUMENTS

| | | | |
|---|---|---|---|
| 4,653,044 | 3/1987 | Kudo | 370/29 |
| 4,897,831 | 1/1990 | Negi et al. | 370/29 |
| 4,905,282 | 2/1990 | McGlynn et al. | 375/8 X |
| 4,953,210 | 8/1990 | McGlynn et al. | 375/8 X |
| 5,121,382 | 6/1992 | Yang et al. | 370/31 |
| 5,257,287 | 10/1993 | Blumenthal et al. | 375/19 |
| 5,311,114 | 5/1994 | Sambamurthy et al. | 370/31 |

Primary Examiner—Douglas W. Olms
Assistant Examiner—Russell W. Blum
Attorney, Agent, or Firm—Joseph A. Sawyer, Jr.; Judy M. Maher

[57] ABSTRACT

A system provides for detection of enhanced capabilities of stations on a communications network. A specified pattern of link test pulses are detected and transmitted to provide for the indication of enhanced capabilities. This is particularly useful for determining whether a particular station is in full duplex or half duplex mode without affecting overall network performance.

18 Claims, 9 Drawing Sheets

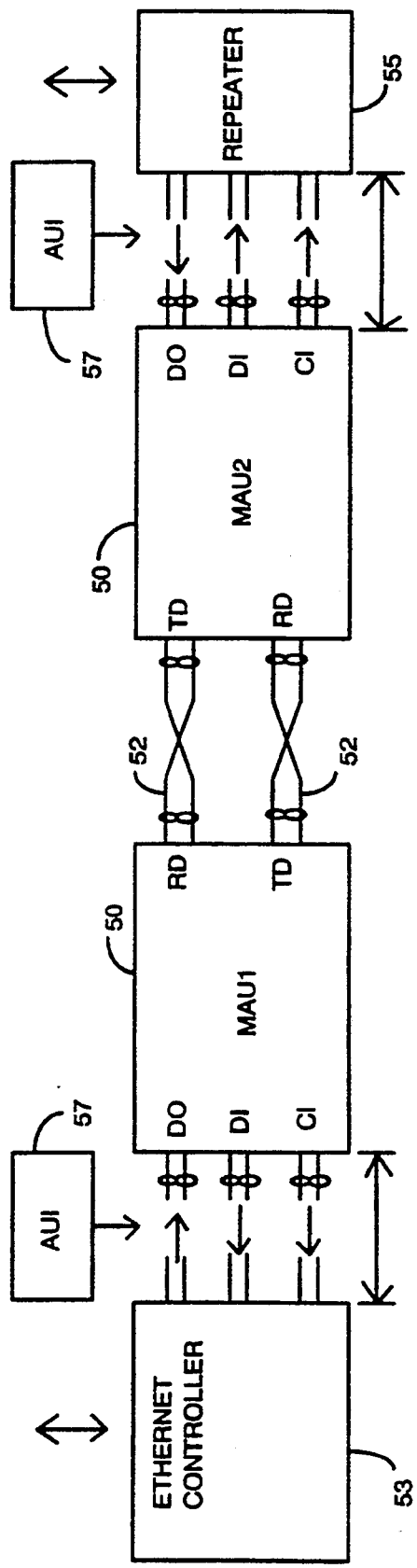
FIG. 1A
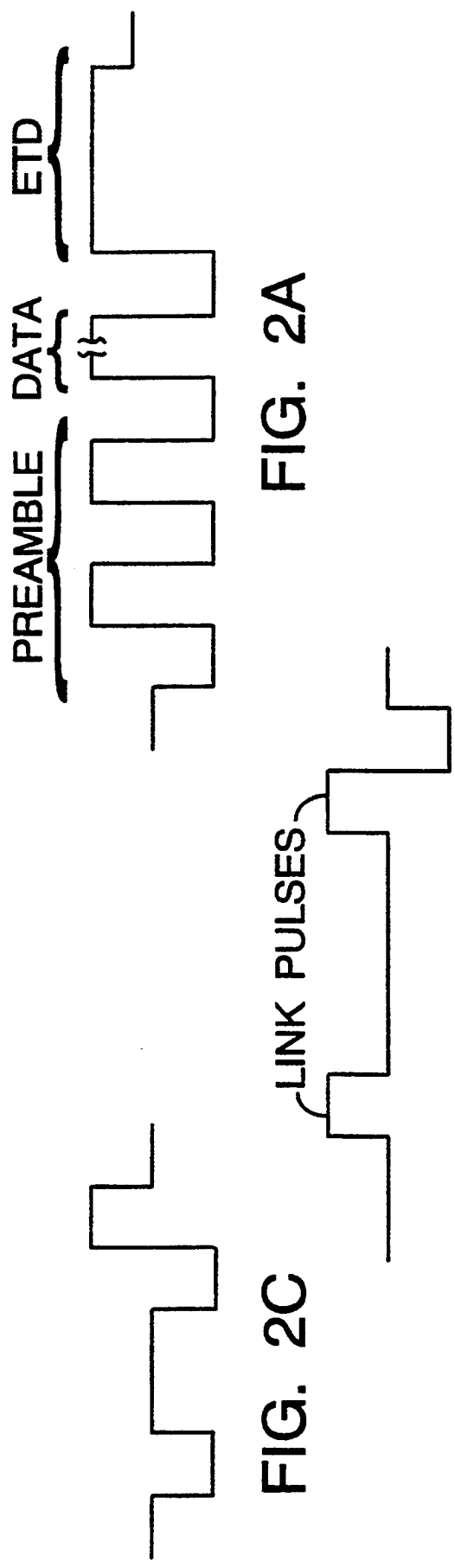
FIG. 2A
FIG. 2B
FIG. 2C

AUTO NEGOTIATION SYSTEM FOR A COMMUNICATIONS NETWORK

FIELD OF THE INVENTION

The present invention relates generally to the field of communication networks and more particularly to networks which include both half-duplex communications channels and full duplex communications channels.

BACKGROUND OF THE INVENTION

A continuing trend within the networking industry is a move to enhance IEEE 802.3/Ethernet performance, using switched and/or full duplex Ethernet capability. This is seen as yet another "mid life kicker" to Ethernet, either preserving existing workstation controllers and providing "dedicated Ethernet" (full 10 Mb/s) to each desktop, or by upgrading the existing adapter to full duplex, for higher performance and enhanced support for interactive applications.

For the current generation of Ethernet controller products, there are two fundamental areas that require modification to support the full duplex capability. Basically these are:

(i) The capability to transmit and receive simultaneously (without collision);

(ii) The capability to "auto-negotiate" between the hub and the end station to determine if the full duplex capability is supported.

The intent of full duplex operation is clear—to increase the performance of an Ethernet link by taking advantage of the 10BASE-T topology, which provides a full duplex communications link (separate transmit and receive circuits and cabling), but is normally used in a half duplex mode for compatibility with existing coax based Ethernet.

There are two components to this performance increase. The first is the physical capability to actually be able to simultaneously transmit and receive. The second is the effective elimination of collisions. Since it is assumed that contention will not occur (an active receiver is no longer an indication that the transmit MAC process must defer), then the end station effectively assumes it can always transmit. This second characteristic has more impact at the hub/repeater than at the end station.

At the hub end, this means that a repeater is inadequate (since it can only deal with a single active receive port at any one time). The repeater must be replaced with a bridge function, which provides the required level of "store and forward" buffering, and routes the packet according to its source/destination address characteristics. This may be by means of the MAC address (in which case it is technically a bridge), or an internetwork address (in which case it would be classed as a router). The integration of this bridge/router functionality into a high performance multiport unit is effectively what the industry refers to as a "switch" in Ethernet terms. Hence from an external perspective, a node (end station) would not be able to detect the difference between being connected to a bridge or a switch.

The examination of a "Switched Ethernet" hub function is not the focus of the present invention, although it is assumed that to implement such a system, a switched hub which would be able to detect (and hence take action upon) an end stations' ability to support a full duplex mode, would be highly desirable. The remainder of this specification will focus on the impact to the end station operation. Note however that typically bridges and routers (hence switches) employ standard Ethernet controller silicon to perform the hub (switch) port function, so this scheme is in fact applicable to both end stations and switch ports.

Consider a typical integrated Ethernet controller such as the PCnet-ISA or MACE controllers manufactured by Advanced Micro Devices (AMD). The following functions would be desired in a full duplex capable version of such a controller product:

(i) Power up in the half duplex (standard Ethernet) mode of operation.

(ii) Determine if the 10BASE-T port receiver is active (if not, assume use of the AUI and remain in half duplex mode). Note that this function is applicable to controllers which support more than one physical medium interface (eg. AUI and 10BASE-T), such as the AMD Pcnet-ISA (Am79C960) and MACE (Am79C940) as in the example of FIG. 1b.

(iii) If the 10BASE-T port is active, determine if the hub/link can support full duplex (and set an internal bit to indicate the link is "full duplex capable").

(iv) If so, switch to the full duplex mode (or move to full duplex if forced by a user programmable bit).

(v) Continue to mimic PCnet-ISA/MACE functionality from a software perspective (loopback, transmit/receive, interface/buffering etc.)

(vi) Allow either the switch port or the controller to request that the link be degraded to standard half duplex 10BASE-T mode, with minimal impact.

Items (iv) and (v) are discussed briefly in the Simultaneous Transmit/Receive section, and items (i) through (iii) and (vi) are discussed in the "Auto-Negotiation" Capability section.

Simultaneous Transmit/Receive

Many Ethernet controller products (including the AMD PCnet family and the MACE product) can architecturally support full duplex operation at the bus interface level.

However, since standard Ethernet (half duplex) operation was always assumed at the network interface, typically some implementation trade offs have been made in many controllers, which would need to be addressed in order to support full duplex. These would include (but may not be limited to):

(i) Two CRC generator/checker circuits must be present to support CRC generation at the transmitter, and checking at the receiver, both being operable simultaneously.

(ii) When in the full duplex mode, the transmit deferral process, the pseudo random number generator for the backoff algorithm, the deferral/retry process and the slot time counter are not required. However, the IPG timer will be necessary, so back-to-back packets will have a minimum of 9.6 ms interpacket gap IPG enforced (for reasons of interoperability with existing LAN analyzer equipment, and existing software interrupt latency issues).

(iii) On transmission, a Loss of Carrier (LCAR) indication will be reported since the transmit to receive loopback function will be disabled in the transceiver, and hence the controller will not be able to detect its own transmission (a normal Ethernet requirement). Either the software driver routine could ignore this fact when in the full duplex mode, or preferably the controller would create a "dummy Carrier" to mask this from the driver.

(iv) The normal blinding period after a transmission, during which the SQE Test sequence from the MAU appears, would be disabled, since an incoming frame may be lost if it commences immediately after a transmission attempt.

(v) The Collision Error (CERR) or SQE Test Error detection and reporting would also be disabled. Since the MAU will have the collision circuit disabled (allowing transmit and receive activity to continue without generation of collision, as opposed to the standard 10BASE-T case), no SQE Test sequence will occur after the end of a transmission. This could be masked in the driver, but it would preferably be handled by the controller itself.

It is assumed that for a full duplex capable controller, the default operation of the device will be to attempt to establish a full duplex link if the 10BASE-T receiver is detected as active. The programming capabilities of the controller are considered in more detail under the "Controller Programming" section.

"Auto-Negotiation" Capability

The objective of the "Auto-Negotiation" function of the present invention is for either end of the link (both end station and hub/switch port) to ascertain the capabilities supported by the device at the other end. Auto-Negotiation is performed out of band (using the normal 10BASE-T link test pulse function), so adds no packet or protocol overhead to the network.

There are schemes which have been utilized to provide full duplex capability in a communications network such as that disclosed in U.S. Pat. No. 5,121,382, entitled STATION TO STATION FULL DUPLEX COMMUNICATIONS IN A COMMUNICATIONS NETWORK. This alternative mechanism for negotiating the capability of the devices at either end of a link uses an "in-band" signaling scheme. An in-band scheme implies that the normal communications channel is utilized as the signalling mechanism. Such a scheme could be envisaged in which one device initiates a special Ethernet frame, advertising that it has enhanced capabilities. The device at the other end of the twisted pair link (referred to subsequently as the "link partner") would receive this, interpret it, and respond appropriately if it had similar capabilities. Hence a relatively simple packet based scheme could be devised to negotiate the full duplex capability.

Although at first this system appears simple and to incur minimal overhead (since the existing signalling is utilized), the scheme has some problems associated with it which are enumerated below:

1. Normal Ethernet MACs do not generate (or intercept) packets themselves, they merely convert packets queued in memory (by the host) for transmission and transmit them over the Ethernet, or receive messages from the Ethernet and place these in memory for processing by the host. Hence a packet based scheme that would be automatic would involve the host in queuing an appropriate message to request the full duplex capability, or awaiting such a request from another device. This would either be the responsibility of the host software, or would have to be accomplished using additional hardware. A software based approach may be preferable from a flexibility point of view, since the specific frame contents and the timing of the request/acknowledge can be tuned for different network protocols. However, this burdens the host processor, and may be a significant issue in a bridge device which already has significant processing overhead. A hardware approach may avoid host processor interaction, but may be inflexible if the messaging scheme requires any adaption for compatibility with the many dissimilar network operating systems that are popularly deployed.

2. Since there is no immediate way of knowing whether the other link partner device supports the full duplex capability, the special negotiation frame may have to be sent a number of times if no response is received. It may also require the negotiation frame to be continuously sent on a periodic basis. Both of these issues mean that finite amount of bandwidth is used by the scheme.

3. Since a special type of negotiation frame must be sent, it would be preferable that only the link partner should receive the frame. However at power up, it is difficult to recognize the station ID of the link partner. This is especially true for the end station learning the address of the switch (bridge) port, since generally the bridge will be transparent (it will leave the source address (SA) field in the packet as the originating station, and not the address of the bridge port that delivered the packet to the end station). Hence it may require use of a multicasting scheme. This in itself has two fundamental issues associated with it.

Firstly, the widespread use of multicast packets should be avoided. Since address detection of multicast addresses is imperfect (it is based on a mathematical "hashing" algorithm ), stations will receive some multicast frames which pass the hash table, but are still not intended for the station. In this case, further software processing is required to eliminate all multicast messages other than those specifically intended to be received. All of this takes additional software resources, and adds to the processing burden of the bridge, which already typically has other multicasts addresses/filtering to do for normal network traffic.

Secondly, the allocation of multicast addresses requires administration, in that other devices on the network may either use the multicast address specified for the negotiation frame, or may use a multicast address which hashes to a similar value. This is especially true when multiple network operating systems and/or protocols are considered. Hence the potential for additional overhead exists, since any existing multicast frames on the network (used by the network operating system and/or network protocol) and the negotiation frames may both be received by any network station which can accept either.

4. The negotiation frame may be construed as some other type of "normal" data packet in some network protocols, in which case it would be passed to the normal network application, even through the contents of the frame are essentially illegal or meaningless from the perspective of the application.

5. The use of special "test packets" which are shorter than the minimum specified for an 802.3 fragment (96 bit times) or frame (512 bit times following preamble and SFD) should be avoided, since these may cause other physical layer network statistics to be falsely corrupted (such counters may exist in managed repeaters for instance). In addition, some network controllers may be designed not to receive illegally shod frames (such as "test packets"), in order to minimize passing of errors resulting from normal collision fragments to the host system.

Accordingly what is needed is a method and apparatus for allowing for the ability to utilize the enhanced capabilities of controllers when utilized in existing networks without the above identified disadvantages. The method and apparatus should be capable of interfacing to controllers with lower level capabilities as well as those with enhanced capabilities. The system should also be one that is minimally disruptive to the network. The present invention provides such a method and apparatus.

SUMMARY OF THE INVENTION

A method and apparatus is provided that allows for the support of enhanced capabilities in a communications network. The ability to provide this support is through the detection of predetermined patterns of link test pulses between stations. In so doing, a system is provided that allows for improved performance of stations on the network when enhancements are made to the stations.

In one aspect, the present invention includes a system for determining whether there are enhanced capabilities between a first and second station within a communications network. The system comprises providing a specified pattern of link test pulses from a first station, the specified pattern indicating that the station has enhanced capabilities, receiving the specified pattern of link test pulses at a second station and the second station then entering an enhanced mode. Thereafter, the specified pattern of link test pulses is provided to the first station from the second station and the first station then entering the enhanced mode.

Another aspect of the present invention includes a system for determining whether there is half duplex or full duplex capability between two stations within a communications network; the system comprises providing a specified pattern of link test pulses from a first station, the specified pattern indicating that the station is full duplex communication capable but is transmitting in half duplex mode and receiving the specified pattern of link test pulses at a second station; the second station then entering the full duplex mode. Thereafter, the specified pattern of link test pulses is provided to the first station from the second station and the first station then enters the full duplex mode.

In yet another aspect of the present invention, the specified pattern includes varying periods of separation of the plurality of link test pulses.

BRIEF DESCRIPTION OF THE DRAWINGS

FIG. 1a is a block diagram having two Medium Attachment Units (MAUs) 50 interconnected by a pair of twisted pair cables 52 to form a simple network.

FIG. 1b illustrates an integrated controller for use in the network of FIG. 1a.

FIG. 2a illustrates one example of a packet having a preamble portion, a data portion and an end of transmission delimiter (ETD) portion.

FIG. 2b is an illustration of two acceptable link test pulse waveforms conforming to the IEEE Specification.

FIG. 2c is an illustration of an inverted link test pulse signal which results from incorrect connection of the twisted pair cable.

DETAILED DESCRIPTION

The present invention relates to an improvement in the efficiency of operation of devices within a communication network. The following description is presented to enable one of ordinary skill in the art to make and use the invention as provided in the context of a particular application and its requirements. Various modifications to the preferred embodiment will be readily apparent to those skilled in the art, and the generic principles defined here may be applied to other embodiments. Thus, the present invention is not intended to be limited to the embodiments shown, but is to be accorded the widest scope consistent with the principles and novel features disclosed herein.

FIG. 1a is a block diagram having two Medium Attachment Units (MAUs) 50 interconnected by a pair of twisted pair cables 52 to form a simple network. The twisted pair cables 52 transmit data packets and link beat pulses from one MAU 50 to the other according to the IEEE 802.3 10BASE-T Standard, which is expressly incorporated by reference for all purposes. The standard requires that when one MAU 50 is not transmitting a data packet to another MAU 50, it should periodically transmit link test pulses to the MAU 50 to test the integrity of the link between the MAUs 50.

Figure 1B:
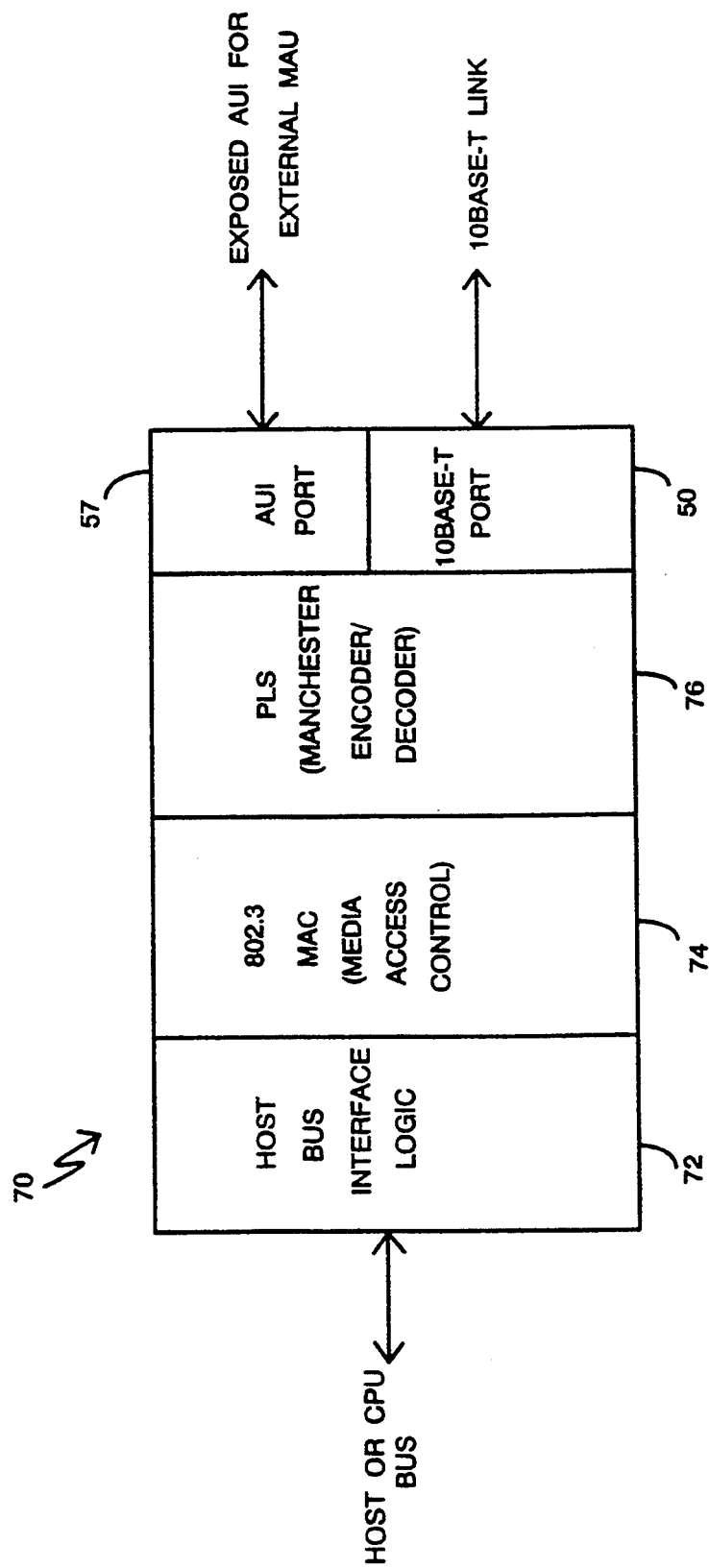

The MAU 50 provides the functional, electrical and mechanical interface between the Data Terminal Equipment (DTE, essentially the Ethernet controller 53) or repeater 55 and the particular network medium in use. Referring now to FIG. 1b what is shown is an Integrated Ethernet Node 70. The Integrated Ethernet Node 70 includes Host Bus Interface Logic 72, Media Access Controller (MAC) 74, Physical Signaling (PLS) 76, an AUI port 57 and an integrated 10BASE-T (MAU 50) port. It is important to note in such node 70 that the MAC 74, PLS 76 and AUI 57 functions are preserved regardless of medium, only the MAU 50 is required to change.

The MAU 50 has six primary functions to perform. These are Transmit Data, Receive Data, Loopback, Collision Detection, SQE Test and Jabber Protection. In addition, the 10BASE-T MAUs provides a seventh Link Integrity function.

Transmit Data

The DTE will present Manchester encoded data for transmission over the network on the DO pair of the AUI 57. The MAU 50 is responsible for receiving the data on DO and forwarding this over the network. The MAU 50 provides the necessary drive capability to transmit the data over the network, and does not modify the content of the data in any way.

Receive Data

The MAU 50 is responsible for ensuring that the valid Manchester data received from the network is passed to the DTE using the DI circuit of the AUI 57. The MAU 50 performs signal amplitude and pulse width detection on the received signal to ensure its quality, before forwarding the unmodified data to the DTE.

Loopback

Manchester data output from the DTE to the MAU 50 on the DO pair, must be returned to the DTE using the DI pair. This loopback mechanism is used by the MAC to indicate that valid network transmission and reception paths exists.

Collision Detection

The MAU 50 is responsible for the detection of collisions on the network. If the MAU 50 detects a collision, it reports this back to the DTE by sending a 10 MHz waveform on the CI pair of the AUI 57. During the collision condition, the MAU 50 continues to return data to the DTE using the DI pair. When the node is no longer involved in the collision (ceases transmission) but the network is still active, the MAU 50 returns data from the network over the DI pair. If the node is the last device to continue to transmit after the collision condition has ceased, the MAU 50 returns the data received on the DO pair (from the DTE) to the DI pair.

SQE Test

After the transmission from the DTE completes, the MAU 50 is responsible for sending a Signal Quality Error (SQE) Test message over the CI pair of the AUI 57. This requires the MAU 50 to attempt to test as much of its collision detection logic as possible, and if functional, indicate this by transmitting a short 10 MHz burst on the CI pair. The SQE Test burst must commence within 0.6–1.6 μs of the transmission ending, and should last 5–15 bit times (1 bit time=100 ns.). Note that if the transmission attempt resulted in a collision and the CI pair was activated, the test is considered to have been performed, and does not have to be repeated at the end of the transmission.

The SQE Test Function is normally provided with an enable/disable feature. The function should be enabled when the MAU 50 is connected to a DTE. The DTE provides a "blinding period" during which it looks for the SQE Test burst after each transmission and does not interpret this as a collision indication. The SQE Test feature must be disabled if the MAU 50 is connected to a repeater, since the repeater does not provide any blinding period, and will detect the SQE Test burst as a collision.

Jabber Function

The Jabber mechanism is provided to prevent a single node which continues to transmit for excessively long periods, from completely utilizing the network. If a DTE transmits on DO for an abnormally long period (20–150 ms), the MAU 50 will interrupt the transmission of data onto the network, disable the loopback path to DI, and indicate a collision using the CI pair. The MAU 50 remains in this state until the data output from the DTE ceases (DO becomes silent), and an "unjab" time expires (0.5±0.25 s).

Link Integrity

Some MAUs 50 provide a mechanism which detects if a valid communications path exists over the network. This mechanism is primarily used in MAUs 50 that use separate transmit and receive signalling paths, such as twisted (10BASE-T) pair and fiber. This facility is important in ensuring correct network operation in these systems, since a break in the receive signal path will render the Carrier Sense facility inoperable.

FIG. 2A illustrates one example of an Ethernet packet having a preamble portion, a data portion and an end of transmission delimiter (ETD) portion. The preamble portion is an alternating series of high and low transitions and the ETD is a high level for a specified minimum time duration. FIG. 2B is an illustration of two acceptable link test pulse transmit waveforms conforming to the IEEE Specification. A link test pulse waveform is either a high transition or a high transition followed by a low transition fitting within a specified pulse template.

A link test state machine which performs the link integrity test functions described in the IEEE 802.3 10BASE-T specification monitors these link test pulses to determine whether any link between two particular MAUs 50 passes a link integrity test. Upon power up or RESET, a particular MAU resets to a particular known state, either a link pass state or link fail state. If there is no packet information received, the MAU 50 will expect to periodically receive a series of link pulses, just as it periodically transmits a link pulse in the absence of other transmissions.

A MAU 50 can be designed to recognize positive-only or any polarity of link test pulses. An advantage of recognizing only one polarity of link test pulse at a time is that it is less likely that noise spikes will be recognized as link test pulses. If a MAU 50 is designed to recognize only positive pulses, it must receive link test pulses similar to those shown in FIG. 2B to enter or remain in the link pass state. If the MAU 50 does not receive positive link test pulses within the time windows specified by the IEEE Specification the MAU 50 will transition to a link fail state.

The link fail state can result from a faulty link, a disconnected lead, disabled driver at the transmitter, reversed leads or other electrical or mechanical fault of the twisted pair cable 52 on its receive data (RD) lines. A reversed twisted pair cable 52 causes a differential receiver to receive an inverted differential signal, meaning that the link test pulses will appear inverted. FIG. 2C is an illustration of an inverted link test pulse signal which results from incorrect connection of the twisted pair cable 52.

In U.S. patent application Ser. No. 07/620,980, entitled IMPROVED AUTOMATED POLARITY DETECTION AND CORRECTION METHOD AND APPARATUS EMPLOYING LINKPULSES, assigned to the assignee of the present application, link integrity status was determined by incorporating link test pulse information to establish an initial polarity, thus allowing a system to pass a link integrity test so that it can transmit data to another MAU, which can, in turn, use the transmitted data to make a final polarity determination. This is especially useful in lightly loaded networks and in those otherwise active networks where no data transmission occurs at infrequent intervals.

However, this reference, although useful for its intended purpose, does not suggest the use of the link test pulse status for determining if a node has enhanced capability. The present invention provides such functionality.

Figure 3A:
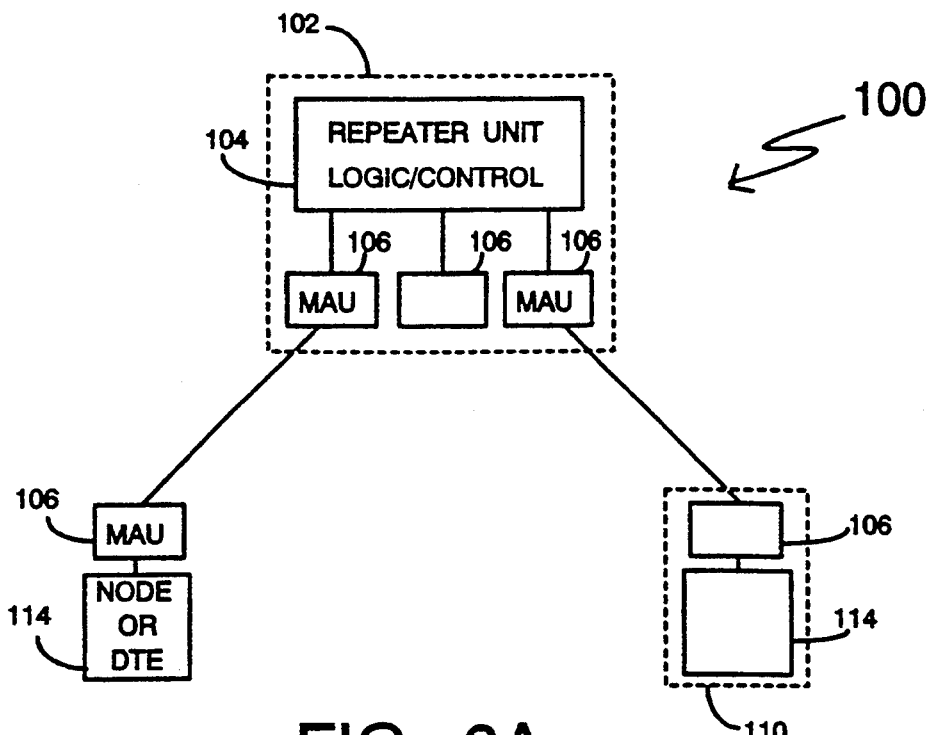
FIG. 3a is a block diagram of an Ethernet communications network based upon repeater technology.

Referring now to FIG. 3a what is shown is a communications network 100 which utilizes repeater based technology. The system includes a repeater set 102. The repeater set 102 includes the repeater unit logic/control 104 which is coupled to a plurality of medium attachment units (MAUs) 106. The repeater set 102 is coupled to a plurality of nodes that can include MAU 106 as shown at block 110 or can be separate units as shown at node 114.

It is expected to be the responsibility of the full duplex capable hub/switch to initiate the "advertisement" that the full duplex capability exists, and the responsibility of the end station controller to detect this, and use it if appropriate.

Figure 3B:
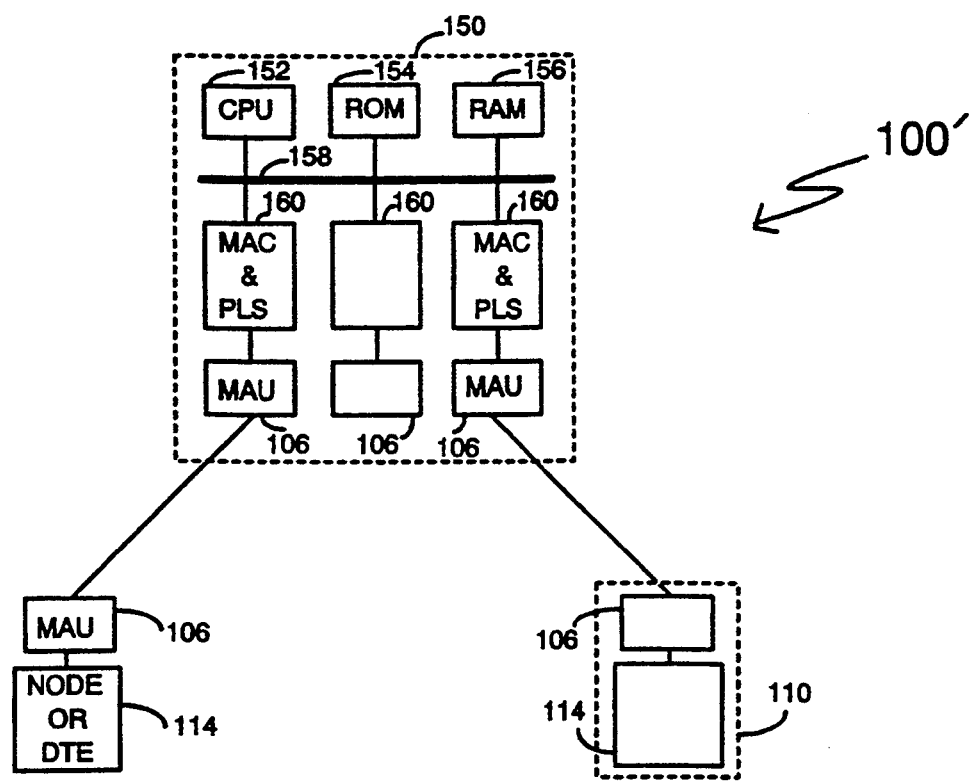
FIG. 3b is a block diagram of an Ethernet communications network based upon switch technology.

Referring now to FIG. 3b what is shown is a block diagram of a communications network 100' that utilizes hub/switch technology. As is seen the network 100' is similar to the network 100 of the previous figure except the repeater set 102 is replaced with the switched hub 150. The switched hub 150 includes a central processing unit (CPU) 152, read only memory (ROM) 154, and a random access memory (RAM) 156 which are all coupled to an internal switch bus 158. Also coupled to the internal bus 158 are a plurality of media access controller (MAC) systems 160. Each of the MAC systems 160 includes MAC and a physical signaling layer. The switched hub 150 allows for the selective storage and transmittal of information received from the different nodes. A repeater as is well known sends information it receives directly on to a receiving station or stations. Accordingly, since a standard 802.3/Ethernet repeater cannot support a full duplex capable end station it is assumed that it would not advertise the full duplex capability. Subsequent to advertising the capability, the hub/switch will need to know that the end station is also full duplex capable.

The basic principle to achieve the "Auto-Negotiation" functionality is to create a distinct pattern of link test pulses combined with varying separation periods (idle). It is possible to create a unique pattern of link test pulses since the 10BASE-T Specification provides substantial margin for their transmission and receipt whilst maintaining full compliance. The transmission of link test pulses is permitted in the 16 ms±8 ms range. The receipt of link test pulses to get out of link fail is between 2 and 10 consecutive pulses, separated by at least 2–7 ms (noise filter) but not greater than 25–150 ms. To stay in the link pass state, a link test pulse must be received within a time period of 50–150 ms.

This system of the present invention requires that specific patterns be both transmitted and detected. The patterns may also be required to fall into the general construct of being within a particular specification such as the 10BASE-T Specification, such that any existing 10BASE-T device, or a future device without the full duplex capability, will perceive any of the patterns as a normal link test pulse sequence, and will fully interoperate at the half duplex level.

Although this specific example of the Auto-Negotiation function is aimed at detecting whether a device is a standard (half duplex) 10BASE-T device or a full duplex capable device, one of ordinary skill in the art will readily recognize that the concept can be extended to other enhanced capability negotiations between the hub/switch and the end station. For instance, whether the device is capable of operation at another speed in addition to 10 Mb/s, such as 100 Mb/s (a dual speed CMSA/CD controller example) or another protocol type such as Demand Priority, defined within the IEEE 802.12 Standard Working Group.

As a cautionary note, some existing MAUs are known to utilize simple mark/space pattern schemes in a technique frequently referred to as "remote fault signalling". This technique allows one end of a 10BASE-T link to advise the device at the other end that a failure has occurred, such events as remote jabber and remote link fail are typically signalled. Clearly, any scheme adopted for simple/duplex negotiation needs to avoid any of the patterns that these schemes use.

So the pattern(s) chosen must:

(i) Be within the 10BASE-T link test pulse requirements.

(ii) Avoid misinterpreting a random (or controlled)incoming pattern as a valid pattern sequence.

(iii) Allow recovery if the pattern is corrupted due to noise or loss of one or more pulses.

(iv) Allow the devices to negotiate from half to full duplex, and preferably from full to half duplex.

For the proposed pattern(s), three generation (idle) periods are implemented. For example, "space1" in the 8–12 ms range, "space2" in the 13–17 ms range and "space3" in the 18–22 ms range.

The pattern spacing of the link test pulses needs to be a repeating sequence of sufficient length to offer reasonable robustness. For instance, space 1, pulse, space 1, pulse, space 2, pulse, space 2, pulse, space 3, pulse, space 3, pulse . . . [repeat].

The absolute spacing or pattern is fairly irrelevant to the overall concept, although it must be consistent between both devices on the link (the "link partners") to provide interoperability.

Note that it would be extremely beneficial if the host personal computer or workstation could disable the full duplex feature (even having at first negotiated that it was acceptable to use full duplex). This could be used (for instance) if it detected inadequate bandwidth on the system bus. In this case, it would also be required that the hub/switch could detect that full duplex support had been terminated on that port. There are several ways to consider how this re-negotiation could take place:

(i) Stop sending the valid "Full Duplex Capable" pattern. The hub/switch would recognize this and revert to half duplex support.

(ii) Do nothing. Since the end station will not attempt to transmit while receiving, it will not generate collisions. If the switched hub attempts to send to the end station while the end station is transmitting, the controller will abandon the transmission attempt. The switched hub port could use the detection of successive packets with CRC errors as a serious fault condition, and re-initialize the link. However, this requires significant MAC layer intervention of the switch and is undesirable.

The switched hub may also wish to drop back to half duplex operation and inform the end station of this condition, to allow internal switch congestion control, for instance. Clearly in this case, the controller would be required to detect the fact that the switched hub port had degraded the link capability. To allow either the switch port or the end station to instigate re-negotiation of the link capability, it is highly preferable to implement a symmetrical algorithm.

From this, it can be seen there are two basic algorithm choices to provide Auto-Negotiation, these are subsequently referred to as "Static" and "Dynamic". Both schemes have merit. The choice of which to provide will be based on an analysis of the system and silicon implementation trade-offs. Alternatively, a hybrid approach may be possible.

A "pattern loss" timer will also have to be present. If the "Full Duplex Capable" pattern does not appear for a specified duration, a device operating in the full duplex mode would revert to half duplex operation. The 10BASE-T Specification, for example, has a 50-150 ms requirement to receive link test pulses, which allows for one in every two pulses to be lost, even when link test pulses are generated by the transmitter using the widest spacing (24 ms). While this "pattern loss" timer needs to be long enough so that the loss/corruption of a single pattern does not cause a return to the half duplex mode, it should be short enough such that when the pattern is deliberately changed (due to the device sourcing the link test pulses requesting a downgrade to half duplex) this should be detected as quickly as possible.

Static Auto-Negotiation:

In the Static Auto-Negotiation scheme, all capabilities of the devices at either end of the link ("link partners") are negotiated during the link test fail state(s). To re-negotiate requires the end station to be in the link test fail state(s).

Advantages of the Static scheme:

1. It is simple since the simplex/duplex capability is only activated from within link test fail state.

2. Only need to generate one "static" pattern from the controller.

Disadvantages of the Static scheme:

1. It requires hub/switch to monitor the link at the packet level for capability changes (the hub would presumably force the end station into link fail by disabling the transmission of link test pulses for a period of time, which would result in total communication loss for some period). This is also technically not in compliance with 10BASE-T requirements.

2. The scheme may require the hub to complete the negotiate sequence prior to sending the first packet (if the first packet allows the end station to exit from the link test pass state in half duplex). This may prevent the use of a sophisticated pattern, since the link partners must enter the "link pass" after only 2-10 link test pulses.

3. The hub/switch must be able to disable transmit link test pulse generation.

4. The negotiation time may exceed 10BASE-T limit of 2-10 link test pulses.

Dynamic Auto-Negotiation:

In the Dynamic Auto-Negotiation scheme, capabilities of the link partners can be negotiated when they are in the link fail and/or link pass states. To re-negotiate requires the end station to send a different pattern of link test pulses.

Advantages of the Dynamic scheme:

1. The hub/switch does not need to negotiate prior to sending the first packet (even if first packet removes the end station from the link test fail state, negotiation can take place subsequently).

2. Two simple patterns could be used, "In Half Duplex Mode but Full Duplex Capable" and "In Full Duplex Mode".

Disadvantages of the Dynamic scheme:

1. Since re-negotiation can occur at any time, the controller may have to detect re-negotiation initiated by the hub (or vice-versa).

2. It requires additional pattern(s) to be generated by the end station (and/or hub).

3. Loss/corruption of a single pattern should not constitute a renegotiate sequence, hence a higher layer time-out function would be required (for instance, if the pattern was not repeated within 250 ms).

4. Careful interlock is required if one end is enabled in full duplex prior to the other.

The following functional descriptions outline the steps for Auto-Negotiation, using the two potential schemes.

Static Scheme-Possible Scenario:
  Connection: Hub active, end station offline (powered down), hub port in link fail state, hub data transmit to end station disabled, hub continuously sends "Full Duplex Capable" pattern
  End station powers up, controller detects "Full Duplex Capable", sends "Full Duplex Capable" pattern to hub
  Hub detects "Full Duplex Capable from end station, initiates full duplex mode on port and moves to link pass state
  Re-negotiate: Controller degrades to half duplex mode (still sends "Full Duplex Capable" pattern)
  Hub detects multiple FCS errors on port
  Hub re-initializes link by disabling data transmit and link test pulse transmit to end station
  Controller moves to link fail (total link failure)
  Controller detects full duplex mode, but replies with "Half Duplex Capable" pattern to hub
  Hub initiates half duplex mode on port and moves to link pass state Alternatively—(note this is not really static, but a hybrid of the Static and Dynamic approach)
  Re-negotiate: Controller degrades to half duplex mode (sends "Half Duplex Capable" pattern)
  Hub detects "Half Duplex Capable" pattern
  Hub degrades to half duplex mode on port Dynamic Scheme—Possible Scenario
  Connection: Hub active, end station offline (powered down), hub port in link fail state, hub data transmit to end station disabled, hub continuously sends "In Half Duplex but Full Duplex Capable" pattern
  End station powers up, controller detects "In Half Duplex but Full Duplex Capable", sends "In Half Duplex but Full Duplex Capable" pattern to hub, initiates full duplex mode and moves to link pass state,
  Hub detects "In Full Duplex mode" pattern from controller and replies with "In Full Duplex Mode" pattern, and initiates full duplex mode on port and moves to link pass state
  Re-negotiate: Controller degrades to half duplex mode (sends "In Half Duplex Mode but Full Duplex Capable" pattern)
  Hub detects "In Half Duplex Mode but Full Duplex Capable" pattern
  Hub degrades to half duplex mode on port (sends "In Half Duplex Mode but Full Duplex Capable" pattern)

Alternatively—(note this assumes that the controller is forced permanently into a half duplex mode and that an additional "Normal 10BASE-T" pattern is generated, which is different to the "In Half Duplex Mode but Full Duplex Capable" and "In Full Duplex Mode" patterns).
  Re-negotiate: Controller forced to half duplex mode (sends "Normal 10BASE-T" pattern)
  Hub detects "Normal 10BASE-T" pattern
  Hub degrades to half duplex mode on port (sends "In Half Duplex Mode but Full Duplex Capable" pattern)

From this it can be seen that the optimal Auto-Negotiation scheme would have three patterns to send/detect:

1. In Half Duplex Mode but Full Duplex Capable (e.g. space1, pulse, space1, pulse, space2, pulse, space2, pulse, space3, pulse, space3, pulse . . . [repeat])
2. In Full Duplex Mode (eg. space 1, pulse, space 1, pulse, space3, pulse, space 3, pulse, space2, pulse, space2, pulse . . . [repeat])
3. Normal 10BASE-T (eg. space2, pulse, space2, pulse, space2, pulse . . . [continuous])

Controller Programming

For a full duplex capable controller, the default operation of the device is to attempt to establish a full duplex link if the 10BASE-T receiver is detected as active. However, the following user programming and status bits must also be provided:

(a) Full Duplex Link (FDL) status bit set by controller to indicate full duplex capable link detected (host read only, 0=half duplex, 1=full duplex).

(b) Auto-Negotiation Enable (ANE) control bit to indicate that auto-negotiation is enabled (default set, host read write, host can disable function).

(c) Duplex/Simplex (D/S) control/status bit. When ANE=1, indicates current operational mode (1=Duplex, 0=Simplex). With this bit and the FDL bit, the exact operational state of the link can be determined. When ANE=0, DIS is a control bit to force the operational state of the controller. Note that if an integrated device such as Integrated Ethernet Node 70 of FIG. 1b has its AUI port selected, half duplex operation is enforced, full duplex mode is only activated when the 10BASE-T port is selected and the link is detected as full duplex capable.

| ANE | FDL | D/S | Status |
|---|---|---|---|
| 0 | 0 | 0 | No full duplex link capability, controller forced to-simplex |
| 0 | 0 | 1 | No full duplex link capability, controller forced to duplex |
| 0 | 1 | 0 | Full duplex link capability, controller forced to simplex |
| 0 | 1 | 1 | Full duplex link capability, controller forced to duplex |
| 1 | 0 | 0 | No full duplex link capability, controller in simplex |
| 1 | 0 | 1 | Invalid |
| 1 | 1 | 0 | Full duplex link capability, controller in simplex (hub is downgrading link) |
| 1 | 1 | 1 | Full duplex link capability, controller in duplex |

When the controller/MAU is in the normal 10BASE-T or full duplex modes, upon detection of the link test fail condition (due to a cable break for instance) by the transceiver, it would be preferable for the device to force itself to half duplex operation. This is particularly important at the end station. Since the loopback function is disabled for full duplex operation, one of the mechanisms used by the controller to detect link fail is removed. So there is no easy way to detect that the receive twisted pair has become disconnected. (Note that if the node is using a packet based "request/acknowledge" protocol for congestion control, loss of service of one of the communication channels due to a cable break may be significant.)

It is clear that the absence of link test pulses would force the 10BASE-T MAU into the link fail state, and would provide no information of the link capability. Some pre-standard 10BASE-T devices do not support link test pulses. For this case, many standard 10BASE-T devices provide the user/host with a capability to ignore the lack of receipt of link test pulses, and force the MAU into the link pass state. In this case, it would be appropriate to force the controller into the half duplex mode, since no capability information can be derived.

In summary, the following enhancements need to be provided to ensure compatibility when an existing half duplex controller is upgraded to have full duplex capabilities:

(a) On transmission in full duplex mode, mask Loss of Carrier (LCAR) from the driver.

(b) Dual CRC generators are required.

(c) After transmission in full duplex mode, disable the SQE Test blinding period to ensure a receive frame that closely follows the end of a transmit frame will be received.

(d) After transmission in full duplex mode, disable the SQE Test detection and reporting of the Collision Error (CERR) or SQE Test Error to the driver.

(e) If a Disable Link Test function (such as the DLNKTST bit in the case of the AMD MACE or PCnet-ISA) is provided, force the controller to half duplex mode since no capability information may be received.

(f) Maintain dynamic (packet-by-packetenable/disable)transmit CRC generation and automatic transmit frame padding consistent at the driver level regardless of simplex/duplex mode.

(g) Maintain loopback mode operation consistent at the driver level regardless of simplex/duplex mode.

(h) For the static scheme, the controller must be able to disable the link test pulse generation (some controllers currently allow the reception of link test pulses at the receiver to be ignored, allowing the receiver to stay in the link test pass state regardless of the link test pulse or packet activity. However, the transmit link test pulse operation continues during this mode).

Dynamic Auto-Negotiation Scheme

Referring back to the disadvantages of the dynamic Auto-Negotiation scheme that were previously outlined:

1. Since re-negotiation can occur at any time, the controller may have to detect re-negotiation initiated by the hub (or vice versa).

2. Requires additional patterns to be generated by the end station (and/or hub).

3. Loss/corruption of a single pattern should not constitute a renegotiate sequence, hence a higher layer time-out function would be required (say if the pattern was not repeated within 150 ms).

4. Careful interlock is required if one end is enabled in full duplex prior to the other.

Issue 1:

One of the problems with getting the dynamic algorithm to operate correctly is the fact that to re-negotiate the link capability, the device must stop transmitting. For instance, assume an adaptor has a lot of transmit data to pass, and as it is in the progress of sending this back-to-back packet burst, it encounters significant receive activity from the switch, causing either a buffer memory, CPU bandwidth or bus bandwidth bottleneck. The host process would first have to detect that there was a resource shortage (not described here, but presumably a hardware and/or software mechanism to detect the resource shortage). The host process would then force the link to half duplex, in an attempt to reduce the offered load, by clearing both the Auto-Negotiation Enable (ANE) and Duplex/Simplex (D/S) bits.

The problem now is that it will take some finite time for the switch to recognize that the "In Full Duplex Mode" pattern has changed to the "Normal 10BASE-T" pattern. In particular, if the controller continues to attempt to send packet data to the switch, no link test pulses will be issued, and hence the switch will be unable to detect the request to degrade the link. If, however, the controller were to disable the transmit process, at the same time that the ANE and DIS bits were cleared, the controller's MAU would revert to sending only link test pulses of the desired pattern, and the switch could detect the request to degrade the link.

This process has the advantage that it appears symmetrical. Furthermore, once the switch recognizes the request to degrade the link, it will disable its transmitter and send the "In Half Duplex Mode but Full Duplex Capable" pattern. The controller could either recognize this, or alternatively ensure that the "normal 10BASE-T" pattern is issued for a predetermined period, before re-enabling the transmit process. At a later point in time, the host process re-allows Auto-Negotiation by setting ANE=1 and again, the controller transmit process is disabled (either implicitly, or explicitly). The controller starts to issue the "In Half Duplex Mode but Full Duplex Capable" pattern, the switch recognizes this and sends the "In Full Duplex Mode" pattern, which the controller uses to re-enable the transmit process.

Note that for protocols which require an explicit "acknowledge", this may be delayed which would throttle the transmit delivery from the other process (received from the switch), although there is a possibility of an upper layer time out if the transmitter of the controller is disabled for a significant period of time (greater than upper layer acknowledge time out).

Issue 2:

The additional patterns required do not substantially complicate the design. The patterns can be chosen to use only 2 or 3 space times, and an ordered sequence. All of the patterns can be produced by merely changing the order of link test pulse spacing.

Issue 3:

Even with the static Auto-Negotiation scheme, it would take the MAU a period equivalent to the link loss time to determine that the link partner had stopped transmitting link test pulses (this assumes that the link partner does not continue to transmit packet data). Once the MAU detects this, it will move to the link fail state (50–150 ms). The link partner would then resume transmission of link test pulses when it was assured that the MAU is link fail, either by timing it itself or by explicit confirmation from the MAU. Note that both link partner devices cannot cease to transmit link test pulses, since this would cause the link to be non-recoverable. The MAU would then detect the new capability advertised by the link test pulse spacing, and move into the link pass state. All this takes anything from 16 ms (2 pulses spaced 8 ms apart) to 240 ms (10 pulses spaced 24 ms apart). On the other hand, the dynamic scheme uses a pattern timer which will time out if the appropriate pattern is not detected for a specified period. This timer must not be set so low such that a minor line disturbance would cause the capability of the link to be detected as changed, but can still be set reasonably so that it adds virtually no complication over the existing link loss time out, and the disturbance to the link is actually shorter.

Issue 4:

Using a scheme where a device that requests a change in the link capability also disables its transmit function solves the interlock problem. It only re-enables its transmit function when it detects that its link partner has recognized the request. This prevents any possibility of contention when one node can be in half duplex and transmitting, to a device that is in full duplex and receiving and commences a transmission (believing the link partner to be also in full duplex). In this case, the full duplex device would complete the transmission and expect it to be received (it will not detect an error condition during the transmission), as well as expect the target node to generate a valid packet. The half duplex device however will terminate its own transmission, sending a normal runt to the link partner device, and it will discard the received frame as a collision. Note that this could result in a late collision at the half duplex device.

Figure 4:
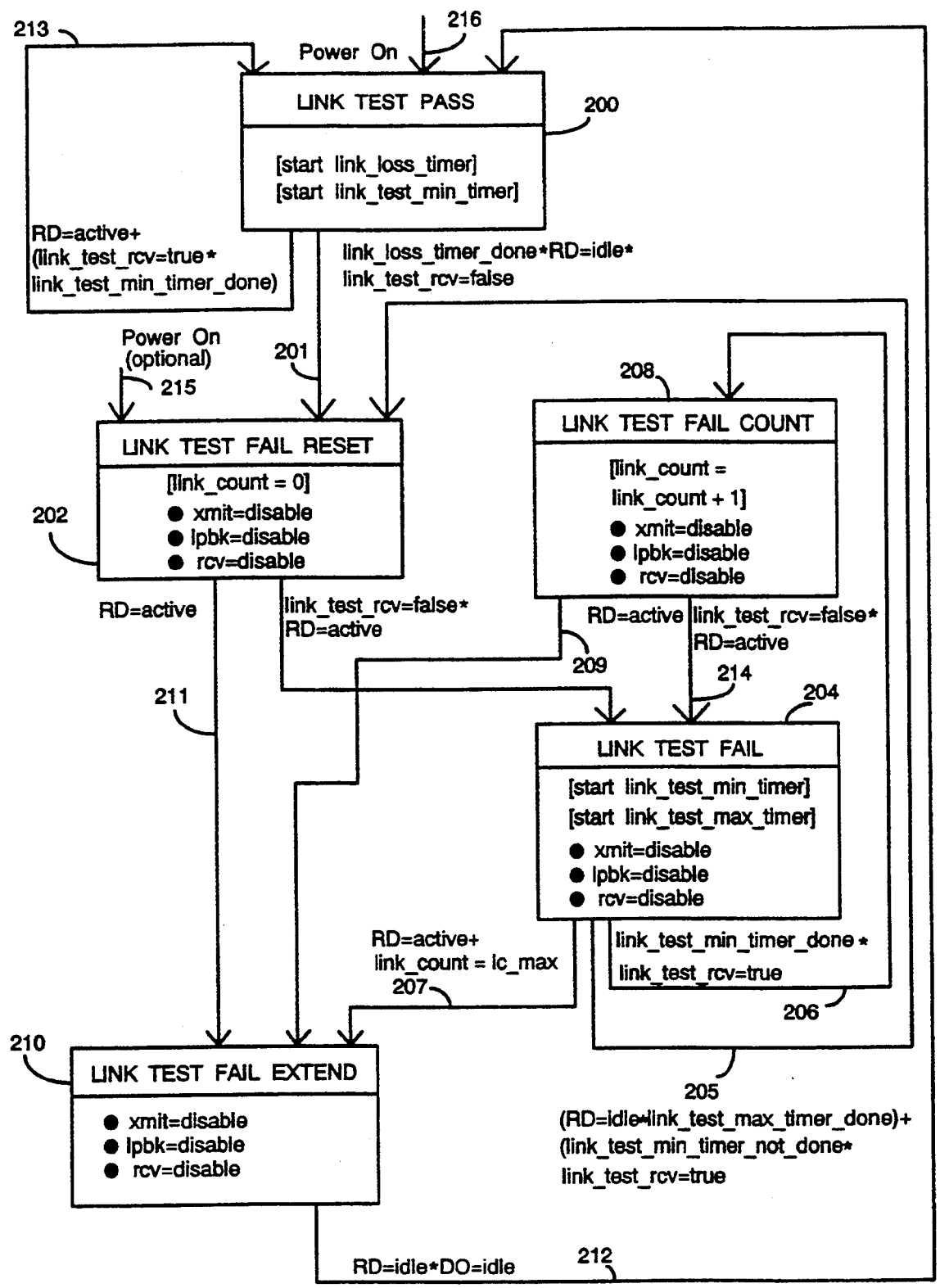
FIG. 4 is a prior art state diagram for determining the receive link integrity.
Figure 5A:
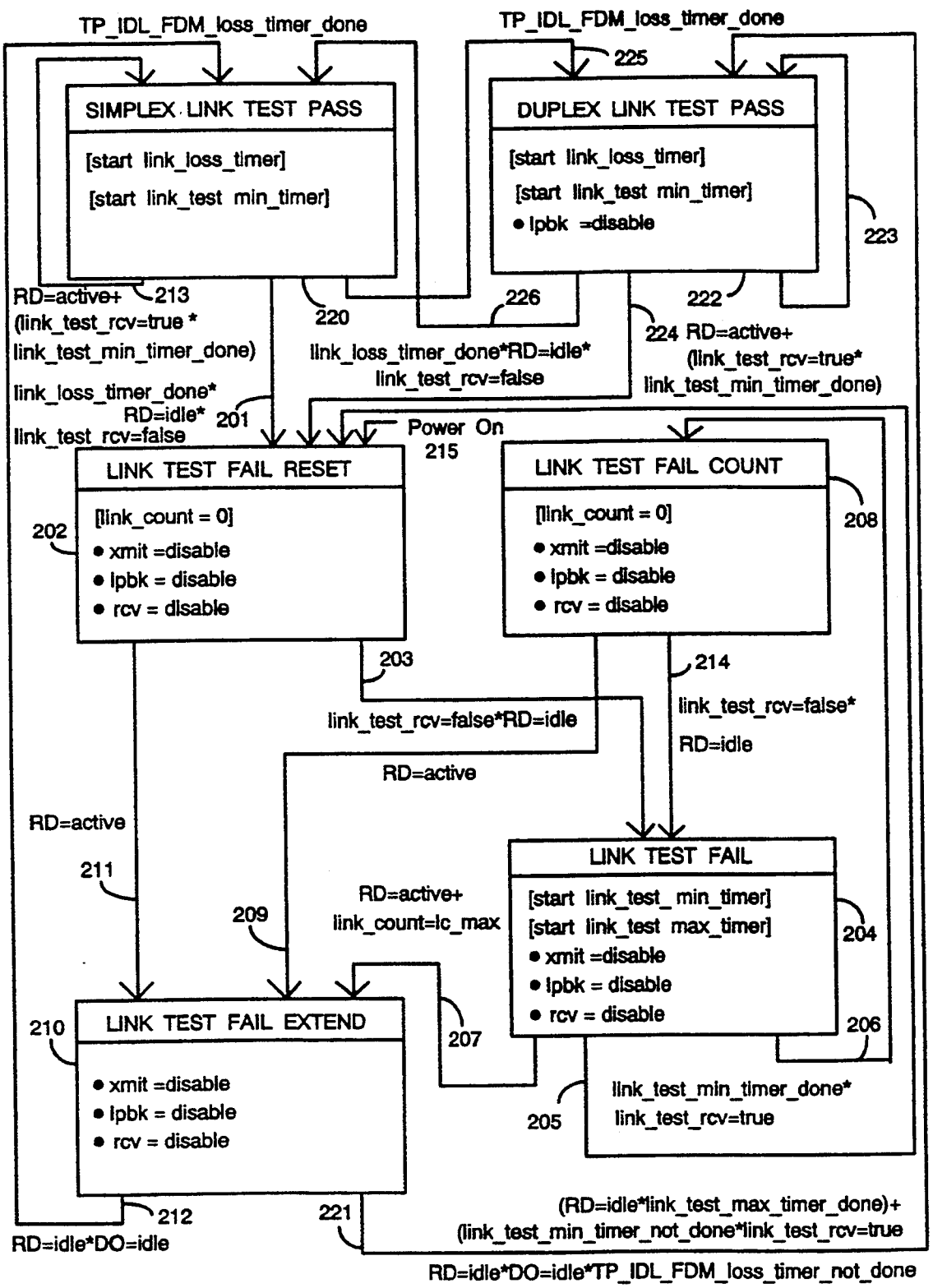
FIG. 5a is a first embodiment of a state diagram for determining the receive link integrity in accordance with the present invention.
Figure 5B:
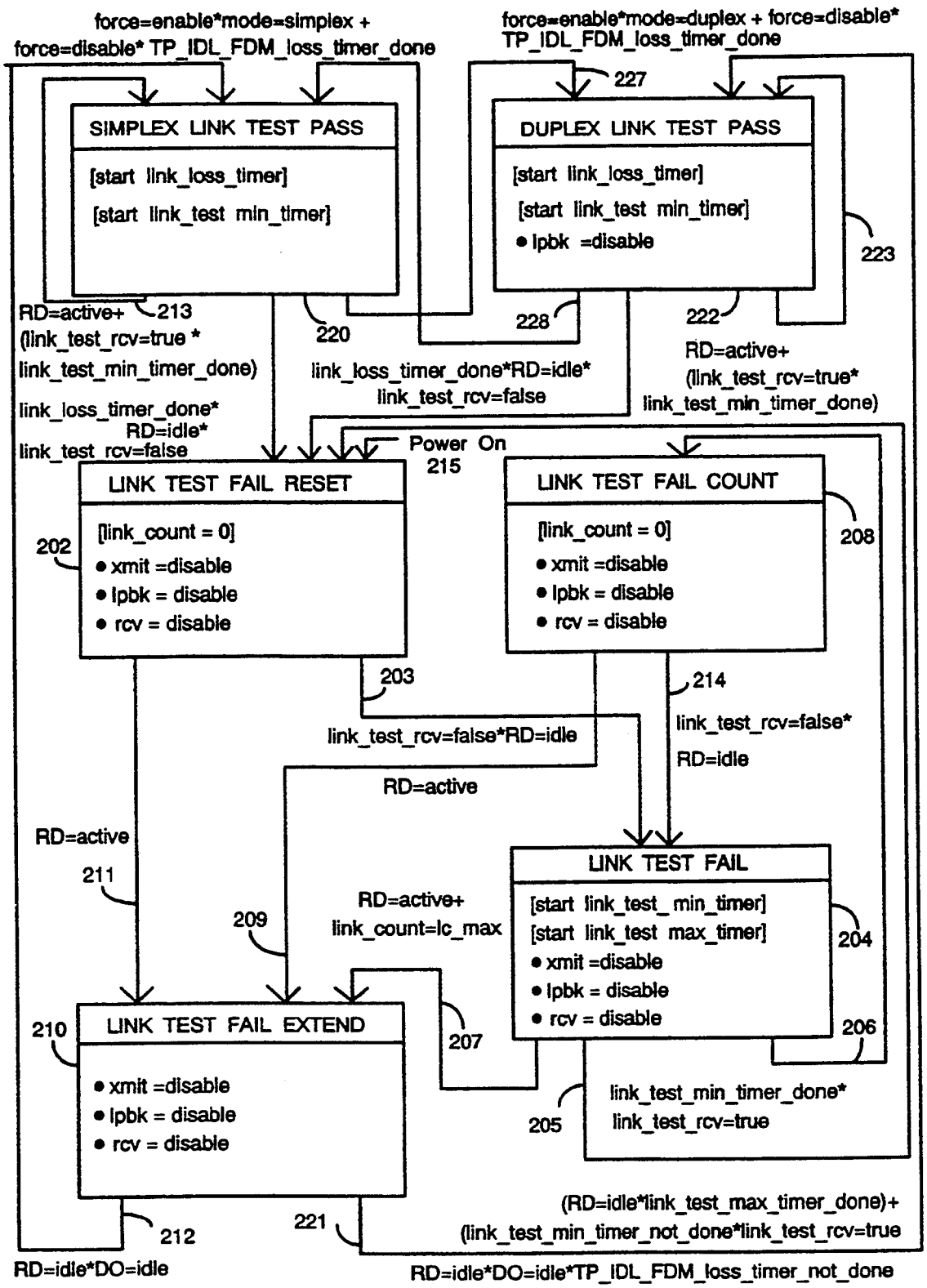
FIG. 5b is a second embodiment of a state diagram for determining the receive link integrity in accordance with the present invention.
Figure 6A:
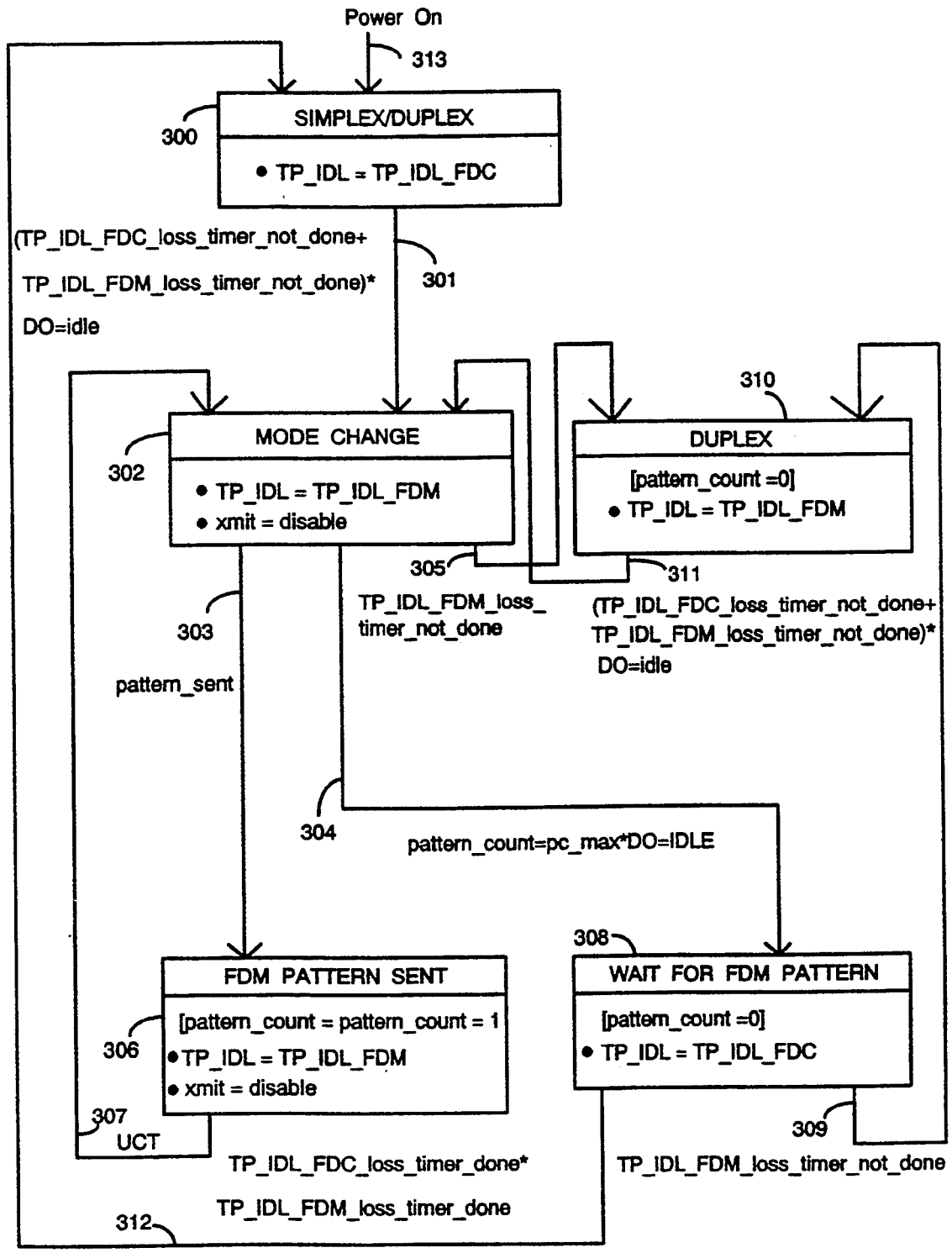
FIG. 6a is a first embodiment of a state diagram for determining the transmit link integrity in accordance with the present invention.
Figure 6B:
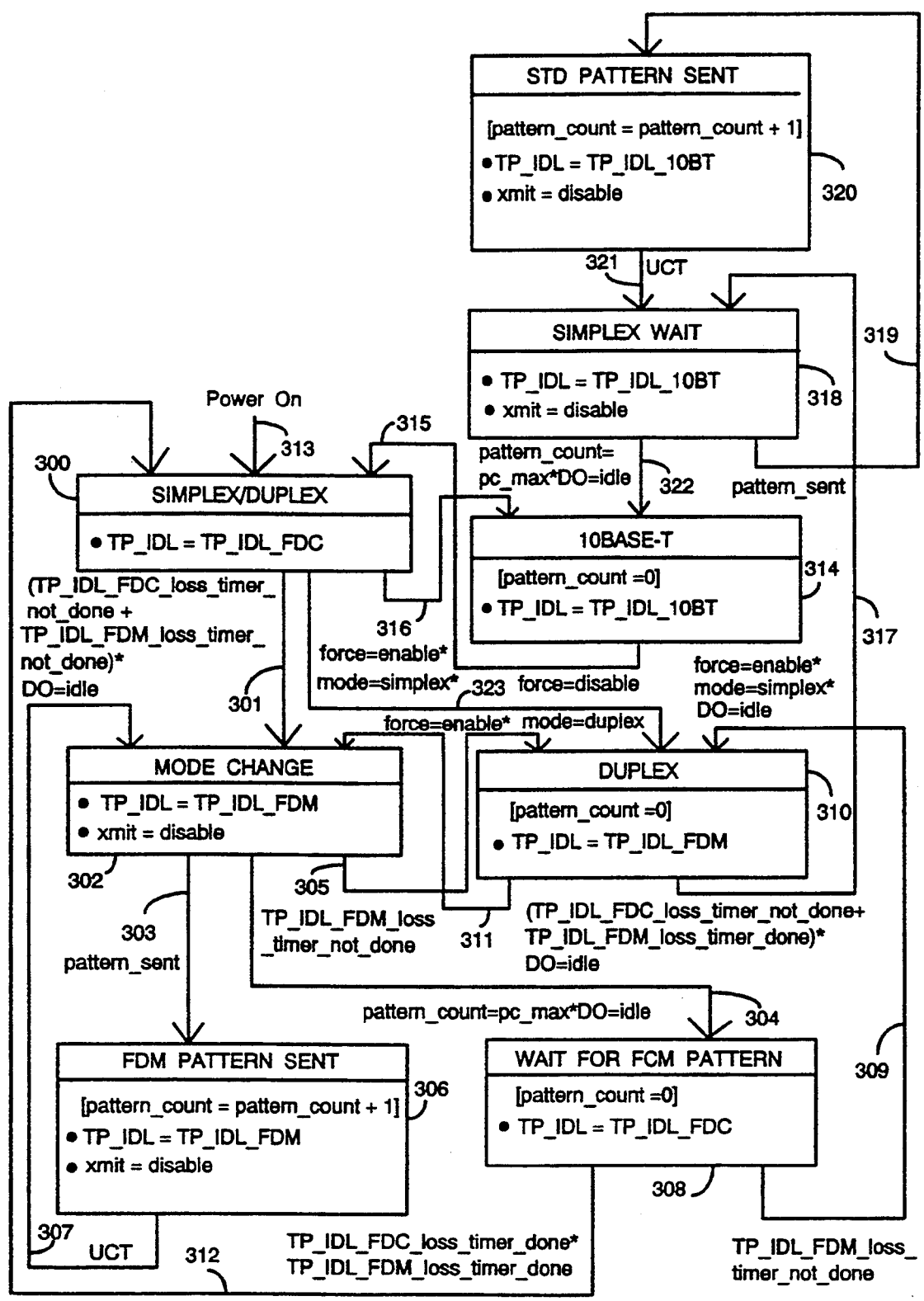
FIG. 6b is a second embodiment of a state diagram for determining the transmit link integrity in accordance with the present invention.

To more fully explain the present invention in terms of the link integrity refer now to FIGS. 4, 5a, 5b, 6a and 6b. FIG. 4 is a state diagram in accordance with the prior art 10BASE-T Specification. FIGS. 5a and 6a are two embodiments of state diagrams for receive link integrity within the 10BASE-T Specification in accordance with the present invention. FIGS. 5b and 6b are two embodiments of state diagrams for transmit link integrity in accordance with the present invention.

Referring now to FIG. 4, a Link Integrity Test Function State Diagram in accordance with the prior art is taken directly from the 10BASE-T Specification (FIG. 14-6 from ISO/IEC 8802-3: 1993 (E), ANSI/IEEE Std 802.3, 1993 Edition). For the following descriptions of the state diagrams, normal IEEE definitions for state diagram variables and timers apply (see sections 14.2.3.1 and 14.3.2 of the 10BASE-T Specification for details).

Referring again to FIG. 4 at Power On 216, the MAU will enter the LINK TEST PASS state 200. Note that the MAU is optionally permitted to enter the LINK TEST FAIL RESET state 208 on Power On 215. One of the principles adopted in the development of the 10BASE-T specification was to ensure that the conditions for transition from any of the LINK FAIL states 202, 204, 208 and 210, to the LINK TEST PASS state 200, were stringent. However, once in the LINK TEST PASS state 200, the requirements are relaxed and it is relatively easy to remain in this state. The intention of this approach is to ensure that if a link failure condition occurs (for instance after power on using the optional approach) the link is qualified as being acceptable for operation as a 10BASE-T link segment.

Assume that after Power On 215, the MAU invokes use of the optional procedure and is in the LINK TEST FAIL RESET state 202. The link_count will be zeroed, and the transmit (xmit), loopback (lpbk) and receive (rcv) functions will be disabled (as they are in all of the LINK FAIL states 202, 204, 208 and 210), meaning:

1. The MAU will be disabled from transferring output data from the AUI Data Out (DO) circuit (the data output of the Ethernet controller) to the network. Although the data transmit function from the controller is disabled, the MAU will continue the transmission of link test pulses.

2. The MAU will not pass present data of the network to the AUI Data In (DI) circuit (the data input to the Ethernet controller). Although the data receive function to the controller is disabled, the MAU will still continue to monitor the occurrence of data or link test pulses on the receiver.

3. The MAU will disable the DO to DI circuit loopback function, so the controller will not detect network activity while it is transmitting (indicating a network fault condition signalled by a "loss of carrier" indication).

A single packet received will move the MAU from the LINK TEST FAIL RESET state 202, to the LINK TEST FAIL EXTEND state 210 via transition 211. Note that prior to a station (or repeater) being powered up, it would not have issued any link test pulses, so it can be assumed that the corresponding repeater (or station) MAU at the opposite end of the link would also be in one of the LINK TEST FAIL states 202, 204, 208 or 210, and hence will also be disabled from sending packet data. This being the case, the MAU will transition from the LINK TEST FAIL RESET state 202 to the LINK TEST FAIL state 204. In the LINK TEST FAIL RESET state 204, the MAU will start two timers, the link_test_rain_timer which is the minimum time that must elapse before a link test pulse may appear after a previous link test pulse, and the link_test_max_timer which is the maximum time that may elapse before a link test pulse must follow the previous link test pulse.

Three exit conditions are permitted from the LINK TEST FAIL state 204. If a link test pulse is received (link_test_rcv=true) after the minimum pulse spacing has elapsed (link_test_min_timer_done), then the transition 206 to the LINK TEST FAIL COUNT state 208 will be made. If however the pulse is received before the minimum pulse spacing has elapsed (link_test_pulse_timer_not_done), or no link test pulse or data is received (RD=idle) before the maximum pulse spacing has elapsed (link_test_max_timer_done), then the transition 205 will be made back to the LINK TEST FAIL RESET state 202, which will again zero the link_count variable. If the total number of link test pulses received exceeds a predefined threshold (Ic_max) or the receiver detects packet activity, the transition 207 will be made from the LINK TEST FAIL state 204 to the LINK TEST FAIL EXTEND state 210.

Assuming that a first valid link test pulse is received, within the allowed spacing periods, the MAU will make the transition 206 from the LINK TEST FAIL state 204 to the LINK TEST FAIL COUNT state 208. On entry to this state, the link_count variable is incremented, counting the number of consecutive, correctly spaced link test pulses that have been received. The MAU will subsequently re-enter the LINK TEST FAIL state 204 once the receiver becomes idle via transition 214. If link test pulses continue to arrive within the prescribed spacing limits, then the MAU will continue via transition 206 between the LINK TEST FAIL state 204 and the LINK TEST FAIL COUNT state 208, and then via transition 214 back to the LINK TEST FAIL state 204. This process will continue until the number of consecutive pulses counted reaches the predefined limit (Ic_max), at which point the transition 207 from the LINK TEST FAIL state 204 to the LINK TEST FAIL EXTEND state 210 will take place.

The MAU will remain in the LINK TEST FAIL EXTEND state 210 until the requirements of transition 212 are both met. This requires that both the Ethernet controller Data Output is idle (DO=idle) to prevent any in-progress transmission from generating an illegal fragment on the network, and the network Receive Data is idle (RD=idle) to prevent any in-progress activity on the network passing a fragment back to the controller.

On entry to the LINK TEST PASS state 200 via transition 212 (or 213), two timers are started. One timer monitors the maximum period that activity can be missing (link_loss_timer) and the other timer monitors the minimum pulse separation permitted (link_test_min_timer). The reception of link test pulses separated by a minimum spacing time, or any receive network activity, is deemed adequate to re-enter the LINK TEST PASS state 200 via transition 213, re-starting the two timers.

With the permitted timer tolerances, it can be seen that only one-out-of-three link test pulses transmitted needs actually to be received to maintain the LINK TEST PASS state 200. This is from the fact that pulses are transmitted with a maximum separation of 24 ms (16 ms±8 ms), and the link_loss_timer has a minimum value of 50 ms (50 ms–150 ms). Therefore the conditions are less stringent to stay in the LINK TEST PASS state 200 via transition 213, than to enter the state via transition 212.

Note also that pulses which are not separated by an adequate spacing (these are assumed to be caused by noise coupled onto the 10BASE-T receiver from adjacent services) will cause the MAU to continually transition between the LINK TEST FAIL state 204 and the LINK TEST FAIL RESET state 202 via transition 205, causing the link_count variable to be continuously zeroed, and preventing entry to the LINK TEST PASS state 200 by any other means than by receiving data (via transitions 207 followed by 212, or 209 followed by 212, or 211 followed by 212). Once in the LINK TEST PASS state 200, even extraneous link test pulses (caused by noise) that are not separated by the minimum timer will not cause the MAU to enter the LINK TEST FAIL RESET state 202, providing that Receive Data (RD) or regularly spaced link test pulses are present, due to the conditions of transition 213. Only the absence of pulses or Receive Data in excess of the link_loss_timer will cause the MAU to enter the LINK TEST FAIL RESET state 202, via transition 201.

Enhancements for Full Duplex Auto-Negotiation Function

To provide the full duplex Auto-Negotiation scheme, the original 10BASE-T link integrity test function is enhanced in several ways. These are summarized as follows:

1. The original link test function state diagram for 10BASE-T, which was concerned only with the reception of link test pulses (or data), is modified and subsequently referred to as the Full Duplex Receive Link Integrity State Diagram, as in FIG. 5a.

2. A new state diagram is added to accomplish the required transmission of link test pulses and is subsequently referred to as the Full Duplex Transmit Link Integrity State Diagram, as in FIG. 6a.

3. Additional state variables, timers and pattern detection functions are added to augment the additional functionality required in the Full Duplex Receive and Transmit State Diagrams.

State Machine Definitions

Only new state variables and timers are defined. All existing 10BASE-T definitions remain. See Section 14.2.3.1 and 14.2.3.2 for details.

TP_IDL_BT—Normal 10BASE-T link integrity test pulses, but not TP_IDL_FDC or TP_IDL_FDM. TP_IDL_BT is defined as (for example):

space2, pulse, space2, pulse, space2, pulse . . . [continuous]

TP_IDL_FDC—Pattern of link integrity test pulses that indicates "In Simplex, but Full Duplex Capable". TP_IDL_FDC is defined as:

space1, pulse, space1, pulse, space2, pulse, space2, pulse, space3, pulse, space3, pulse . . . [repeat]

TP_IDL_FDM—Pattern of link integrity test pulses that indicates "Full Duplex Mode". TP_IDL_FDM is defined as:

space1, pulse, space1, pulse, space3, pulse, space3, pulse, space2, pulse, space2, pulse . . . [repeat]

force: Indicates external override of Auto-Negotiation.

Values: enable; device is forced dependent on mode variable disable; device will Auto Negotiate mode mode: Indicate state for external force override.

Values: simplex; MAU is forced in simplex mode if force=enableduplex; MAU is forced in duplex mode if force=enable NOTE: The state diagrams of FIG. 5a and 6a do not require the use of the "force" or "mode" variables. All transitions and states relating to these are therefore removed. However, the state diagrams of FIG. 5b and 6b include the enhanced capability to force the device to either full or half duplex using either software programmable bit or a hardware defined input signal.

TP_IDL_FDC_loss_timer. Timer for longest time that TP_IDL_FDC pattern can be missing.

TP_IDL_FDM_loss_timer. Timer for longest time that TP_IDL_FDC pattern can be missing.

NOTE: Normal 10BASE-T state diagram conventions apply to timers. For instance, when the TP_IDL_FDC_loss_timer is timing, the variable TP_IDL_FDC_loss_timer_not_done will be true and the variable TP_IDL_FDC_loss_timer_done will be false. When the timer has completed its time out period, the variable TP_IDL_FDC_loss_timer_done will be true and the variable TP_IDL_FDC_loss_timer_not_done will be false.

pattern_sent. One complete pattern (or a sequence of 6 pulses) has been transmitted.

pattern_count. Counter incremented when one complete pattern (or a sequence of 6 pulses) has been sent.

pc_max. Maximum number of patterns to be transmitted.

Full Duplex Receive Link Integrity State Diagram—FIG. 5a

The summary of enhancements to the original 10BASE-T version are as follows (a comparison of FIG. 4 versus FIG. 5a):

(a) The LINK TEST PASS state 200 of FIG. 4 is changed to the SIMPLEX LINK TEST PASS state 220 in FIG. 5a.

(b) A new DUPLEX LINK TEST PASS state 222 is added to FIG. 5a.

(c) The optional Power On 215 to the LINK TEST FAIL RESET state of FIG. 4 is modified to be mandatory in FIG. 5a.

(d) New transitions to/from the new or modified states 220 and 222 are added, namely 221,223, 224, 225 and 226.

(e) Two new timers are added, TP_IDL_FDC_loss_timer and TP_IDL_FDM_loss_timer, which are defined in the new state variable definitions as documented previously.

Referring to FIG. 5a, at Power On 215, the MAU enters the LINK TEST FAIL RESET state 202. Operation while in any of the LINK TEST FAIL states (202,204, 208 and 210) is identical to that described for the 10BASE-T case, as previously defined. The only operational differences are the exit conditions from the LINK TEST FAIL EXTEND state 210.

When in the LINK TEST FAIL EXTEND state 210, the MAU will wait for any in progress Data Out from the Ethernet controller (on DO) or Receive Data from the network (on RD) to complete. If they are both idle, transition 221 will be made if the variable TP_IDL_FDM_loss_timer_not_done is true (the timer is timing, hence the Full Duplex Mode pattern has been detected at the receiver) and the MAU will enter the DUPLEX LINK TEST PASS state 222. If the Full Duplex Mode pattern has not been detected by the MAU receiver, the transition 212 is made to the SIMPLEX LINK TEST PASS state 220.

When in the SIMPLEX LINK TEST PASS state 220, the MAU will remain in this state by re-entry via transition 213 while valid link test pulses or data are received (identically to FIG. 4). Transition 201 to the LINK TEST FAIL RESET state 202 will only occur if no link test pulses or data are received for a period in excess of the link_loss_timer (also identically to FIG. 4). If however, the receiver detects the TP_IDL_FDM pattern, the transition 225 will occur to the DUPLEX LINK TEST PASS state 222.

In the DUPLEX LINK TEST PASS 222 state, the timer for the maximum period of inactivity of link test pulses or data (link_loss_timer), and the timer for minimum link test pulse width separation (link_test_min_timer) are started. In addition, the loopback function is disabled, and the Control In (CI) circuit is forced to idle (not shown in FIG. 5a).

The CI circuit is used by the MAU to signal the controller that a collision has occurred (Collision Presence), an SQE Test is in progress, or a jabber condition has occurred. The MAU returns a nominal 10 MHz signal to the controller when any of these conditions are detected. Since each of these events is serviced by a separate MAU state machine (FIG. 14-3, 14-4 and 14-5 in the 10BASE-T Specification) the disable of the CI function is not performed in either the Full Duplex Receive or Transmit State Diagrams. Instead, it is done at the controlling state diagram individually.

Some discussion is necessary at this point regarding implementation. Since this is primarily considered a MAU specification, it is assumed that the only signalling between the MAU and the controller (MAC and PLS functions) may be the standard AUI signals. In this case, it is likely that the CI circuit will be completely ignored by the controller when in the full duplex mode (this would be the simplest implementation). However, it would be useful, given that the jabber condition is still possible, to signal jabber using the CI circuit, and just to disable the Collision Presence and SQE Test functions. It may therefore be preferable to implement a full duplex capable controller with the capability to abandon its transmission if it detects activity on the CI pair (which would infer an excessively long transmission attempt), although this would restrict the packet size to within the Ethernet norms. A MAU in the full duplex mode would not activate the CI pair during simultaneous Transmit Data (TD) and Receive Data (RD)

network activity, since this is a natural occurrence in the full duplex configuration (but would indicate Collision Presence in a normal half duplex MAU). The SQE Test function would also be disabled, since a test of the collision detection logic is inappropriate for duplex operation.

Although this provides a mechanism to detect jabber even in a full duplex controller, having eliminated the collision detect time (slot time) restrictions of the contention based Ethernet, it may be desirable to increase the frame size substantially, in which case the jabber function should be disabled. The transmission of frames much larger than Ethernet norms has other implications, such as compatibility with mixed full and half duplex configurations, but is not discussed further here.

For a fully integrated controller function which includes the MAU functionality such as the Integrated Ethernet Node 70 of FIG. 1b, since the existence of a physical implementation of the AUI is not necessary, alternative techniques can be used to allow maximum flexibility, allowing the implementation of a programmable jabber detect which can be enabled or disabled when in the full duplex capable mode.

The DUPLEX LINK TEST PASS state 222 defines the full duplex capability of the controller/MAU. It is appropriate when in this state, to provide an indication from the controller/MAU that the device is operating in the full duplex mode, via an external hardware signal or software status bit.

Three exit conditions are possible from the DUPLEX LINK TEST PASS state 222. The MAU will remain in this state via transition 223 while valid link test pulses or data are received (identically to the re-entry of the SIMPLEX LINK TEST PASS state 220 via transition 213). Transition 224 to the LINK TEST FAIL RESET state 202 will only occur if no link test pulses or data are received for a period in excess of the link_loss_timer (identical to the exit transition 201 from the SIMPLEX LINK TEST PASS state 220). If however, the TP_IDL_FDM_loss_timer_done signal is asserted, this indicates that the MAU receiver has not been able to identify the TP_IDL_FDM pattern for an excessive period of time, and transition 226 will occur to the SIMPLEX LINK TEST PASS state 220.

Full Duplex Transmit Link Integrity State Diagram—FIG. 6a

The Transmit Link Integrity State Diagram is an entirely new function, since in a normal 10BASE-T compatible station there is no concept of transmitting a pattern (or number of patterns). It is the algorithm executed by this state machine that enables the Auto-Negotiation to be executed in a symmetrical fashion, initiated by either end of the link. The transmit link algorithm operates asynchronously to the receive algorithm.

Referring now to FIG. 6a, at Power On 313, the MAU will enter the SIMPLEX/DUPLEX state 300. In this state, it will transmit the "Full Duplex Capable" link test pulse pattern (TP_IDL_FDC). This is the default state for the device. If the MAU receiver is unable to detect either a "Full Duplex Capable" or "Full Duplex Mode" pattern from the link partner, then the MAU will remain in this state indefinitely. This means that if a normal 10BASE-T device is acting as the link partner, it will be detected by the Full Duplex Receive Link Integrity State Diagram, and the link will operate normally in the half duplex mode.

If the MAU receiver detects either the TP_IDL_FDC or TP_IDL_FDM patterns being returned by the link partner, the MAU will move to the MODE CHANGE state 302 via transition 301. Note that the DO circuit from the controller must be idle before the transmission is made, ensuring that any in-progress transmission is completed prior to the transition 301.

On entry to the MODE CHANGE state 302, the link test pulse pattern is changed to indicate "Full Duplex Mode" (TP_IDL_FDM), and the transmitter is disabled. The reason that the transmitter is disabled is that the device is now essentially ready to initiate full duplex operation, but is not certain of the state of the link partner. If the link partner was still configured for simplex operation, and this MAU initiates full duplex operation, it would allow a transmission even if the link partner were also transmitting (to this MAU). In this case, a collision could result at the link partner (since it is in normal simplex mode), which would terminate the transmission to this MAU, and would discard the transmission from this controller/MAU to it as a collision, both undesirable. In addition, disabling the transmitter for a short period ensures that the TP_IDL_FDM pattern is issued (since there will be no data activity). If the MAU detects that the link partner is already in the full duplex mode (TP_IDL_FDM_loss_timer_not_done), it will transition immediately to the DUPLEX state 310. If it continues to see the TP_IDL_FDC pattern returned from the link partner (or any other pattern), it will wait until a complete TP_IDL_FDM pattern is sent (pattern_sent), and move to the FDM PATTERN SENT state 306 via transition 303.

In the FDM PATTERN SENT state 306, the transmit process remains disabled, the MAU continues to transmit the TP_IDL_FDM pattern, and the pattern_count variable is incremented. An unconditional transfer (UCT) subsequently takes place back to the MODE_CHANGE state 302. The TP_IDL_FDM pattern will be repeated until the pattern_count variable reaches the predefined pc_max value (chosen to ensure that the transmitter is not disabled for long periods). If the link partner has still failed to return the TP_IDL FDM pattern by this time (for instance, it may itself be transmitting a series of back-to-back packets), the transition 304 to the WAIT FOR FDM PATTERN state 304 is made, once any in-progress transmission from the controller ceases. (DO=idle)

This now implies that either a TP_IDL_FDC or TP_IDL_FDM pattern was recognized from the link partner when in the SIMPLEX/DUPLEX state 300. Subsequent transmission of a TP_IDL_FDM pattern back to the link partner, for a series of patterns, has still not yielded a TP_IDL_FDM confirmation from the link partner. Hence in the WAIT FOR FDM PATTERN state 308, the MAU waits either to see if the pattern match was an error (a random pattern which passed the TP_IDL_FDC or TP_IDL FDM match criteria), or whether the link partner is merely taking a substantial time period to acknowledge. Hence the transmit process is re-enabled, the pattern_count is zeroed, and the MAU reissues the TP_IDL_FDC pattern. If the received pattern was detected in error, it will be unlikely to repeat consistently, and therefore both the pattern loss timers will expire, and the transition 312 back to the default SIMPLEX/DUPLEX state 300 will occur. If the device eventually responds with the TP_IDL_FDM pattern, the transition 309 to the DUPLEX state 310 will occur.

In the DUPLEX state 310, the pattern_count is zeroed and the TP_IDL_FDM pattern is transmitted. The transition 311 back to the MODE CHANGE state 302 will occur if the TP_IDL_FDM pattern is lost (TP_IDL_FDM_loss_timer_done) or the TP_ID-L_FDC pattern is detected (TP_IDL_FDC_loss_timer_not_done) and the DO output from the controller is inactive (since the transmitter will be disabled in the MODE CHANGE state 302).

Entering the MODE CHANGE state 302 via the transition 311 from the DUPLEX state 310 indicates that the link partner has ceased transmission of the TP_IDL_FDM pattern. The TP_IDL_FDM pattern will continue to be issued by this MAU until the number of repeated patterns defined by pc_max have occurred, at which point if the link partner has failed to resume transmission of the TP_IDL_FDM pattern, the transition 304 to the WAIT FOR FDM PATTERN state 308 will occur, followed by the transition 312 back to the SIMPLEX/DUPLEX state 300 if both pattern timers have timed out.

Enhancements to Force Re-Negotiation

Use of an override to force the device into the duplex or simplex mode is described by the modified state diagrams of FIGS. 5b and 6b.

The force function is invoked either by hardware inputs to the device or by software programmable register bits. Neither of these options is particularly attractive for an external MAU (although they are not precluded), since the AUI makes no provision for additional signals, and since MAUs generally are non-intelligent devices. However, for a fully integrated controller (such as shown in FIG. 1b), either approach would be acceptable, since the controller already provides a bus interface to allow packet data transfer and the host processor to perform status/control programming access.

One of the primary benefits offered by the force enhancement is the ability to allow either end of the link to force a downgrade on the link, from full duplex to half duplex, in a minimal time period.

Referring to the Full Duplex Receive Link Integrity State Diagram of FIG. 5b, only two changes are necessary over the original of FIG. 5a. The transition 227 from the SIMPLEX LINK TEST PASS state 220 to the DUPLEX LINK TEST PASS state 222 is modified to include the capability to force the device from simplex to duplex mode. Similarly, the transition 228 from the DUPLEX LINK TEST PASS state 222 to the SIMPLEX LINK TEST PASS state 220 is modified to include the capability to force the device from the duplex to simplex mode. Note that while in either LINK TEST PASS states 200 or 222, the force function overrides any pattern detect functions, although the device may still enter the LINK FAIL RESET state 202 if link test pulses are not present.

With reference to the Full Duplex Transmit Link Integrity State Diagram of FIG. 6b, several changes are necessary over the state diagram of FIG. 6a to accomodate the force enhancement. These are primarily:

1. Three additional states are needed to allow a third pattern to be generated. This third pattern (TP_ID-L_10BT) meets the criteria for a normal 10BASE-T link test pulse train but does not meet the requirements of either the "Full Duplex Capable" (TP_IDL_FDC) or "Full Duplex Mode" (TP_IDL_FDM) patterns.

2. Additional state transitions are provided such that the force function can cause the TP_IDL_10BT pattern to be generated.

In the configuration of FIG. 6a, only the TP_ID-L_FDC or TP_IDL_FDM patterns are generated. For a station wishing to degrade the link performance to half duplex, while it could stop sending the TP_ID-L_FDM pattern and instead issue the TP_IDL_FDC pattern, this will still cause the link partner to believe the device is capable of full duplex operation. This will cause the transmit link state machine of the partner to continue to send TP_IDL_FDM pattern for a number of cycles (defined by pc_max) and ultimately remain in the WAIT FOR FDM PATTERN state 308 sending TP_IDL_FDC. While this is not a problem operationally, it may be desirable to downgrade the link by appearing to act as a simplex 10BASE-T device, and stop the advertisement of "Full Duplex Capable", since the full duplex service is unavailable when forced to simplex.

If the MAU is in the SIMPLEX/DUPLEX state 300, forcing simplex operation causes the immediate transition 316 to the 10BASE-T state 314, where the TP_ID-L_10BT pattern is issued. Since no effective change in operational mode is made in this transition, the transmit process need not be interrupted. If the duplex mode is forced when in the SIMPLEX/DUPLEX state 300, the transition 323 is made to the DUPLEX state 310. Although this does involve a mode change, since the device was in simplex, it could only have been receiving or transmitting. Since in duplex mode it can do both, there is no requirement to disable the transmit process, although this could be performed by an intermediate state (not shown) if it is deemed essential to advertise the full duplex capability prior to invoking it. Note that forcing full duplex operation may cause significant packet error conditions if the link partner is not capable of supporting full duplex. If it is capable of full duplex, it could auto-negotiate. Hence, force duplex mode is considered important for full duplex devices not capable of Auto-Negotiation, hence advertising the full duplex capability is considered of minimal value.

If however the MAU is in the DUPLEX state 310, forcing simplex operation will cause transition 317 to the SIMPLEX WAIT state 318 once any in-progress transmission from the controller has completed (to ensure that both transmit and receive processes are not active before the change to simplex). In the SIMPLEX WAIT state, the transmit process is disabled, to allow the change from duplex to simplex mode to be advertised to the link partner. Once six pulses have been transmitted (pattern_sent), the transition 319 to the STD PATTERN SENT state 319 will occur, where the pattern_count variable is incremented. The unconditional transition (UCT) 321 will occur to return the MAU to the SIMPLEX WAIT state 318, where a further pattern of six pulses will be issued. This process will repeat until the pattern_count reaches the predetermined maximum count (pc_max), and the transition 322 from the SIMPLEX WAIT state 318 to the 10BASE-T state 314 will occur providing the controller DO circuit is idle. Note that a further enhancement could be made, if valuable, to have more than one pc_max value; one for counting actual TP_IDL_FDC or TP_IDL_FDM patterns, the other simply to count the number of regular 10BASE-T link test pulses (TP_ID-L_10BT) that were transmitted.

Release of the force condition when in the 10BASE-T state 314 will allow the transition 315 back to the normal default SIMPLEX/DUPLEX state 300.

Further Enhancements

Further enhancements to the algorithm can be readily achieved, for instance:

Note that this is currently accomplished, since loss of all link pulses will clearly result in loss of the TP_IDL_FDM pattern, causing the transmit link integrity state machine of FIG. 6b to move from the DUPLEX state 310 via transition 311 to the MODE CHANGE state 302. Subsequently, after sending the TP_IDL_FDM pattern until the pc_max value is met, the transmit state machine will move to the WAIT FOR FDM PATTERN state 308, and due to the complete link loss, via the transition 312 to the SIMPLEX/DUPLEX state 300, where the TP_IDL_FDC pattern will be issued, which is the desired outcome.

However, an alternative to this would be to enhance FIG. 6b, to allow a transition directly from the DUPLEX state 310, to either the 10BASE-T state 314 (where the TP_IDL_10BIT pattern would be transmitted), or the SIMPLEX/DUPLEX state (where the TP_ID_FDC pattern would be transmitted), without sending the TP_IDL_FDM pattern while in the intermediate states. Clearly, only one of these transitions would be provided, depending on the desired pattern to be transmitted. Such a transition can be made directly, since knowledge that the receive link integrity state machine has moved to the LINK FAIL RESET state 202, immediately indicates that the MAU (or controller) will have its transmit function disabled (hence it will be able to transmit any alternate pattern immediately). Such a transition can be accomplished by adding a single additional variable, defined as "link_fail_state". This variable would be set true on entry to the LINK TEST FAIL RESET state 202, and set false on entry to both the SIMPLEX LINK TEST PASS state 220 or DUPLEX LINK TEST PASS STATE 222.

Hence with this enhancement, on detection of link fail (entry to the LINK FAIL TEST RESET state 202) the MAU would either:

1. Issue the TP_IDL_FDC pattern, assuming a new transition from the DUPLEX state 310 to the SIMPLEX/DUPLEX state 300 were provided, based on the term "link_fail_state=true".

2. Issue the TP_IDL_10BT pattern, assuming a new transition for the DUPLEX state 310 to the 10BASE-T state 314 were provided, based on the term "link_fail_state=true".

Receive Pattern Detection

Figure 7:
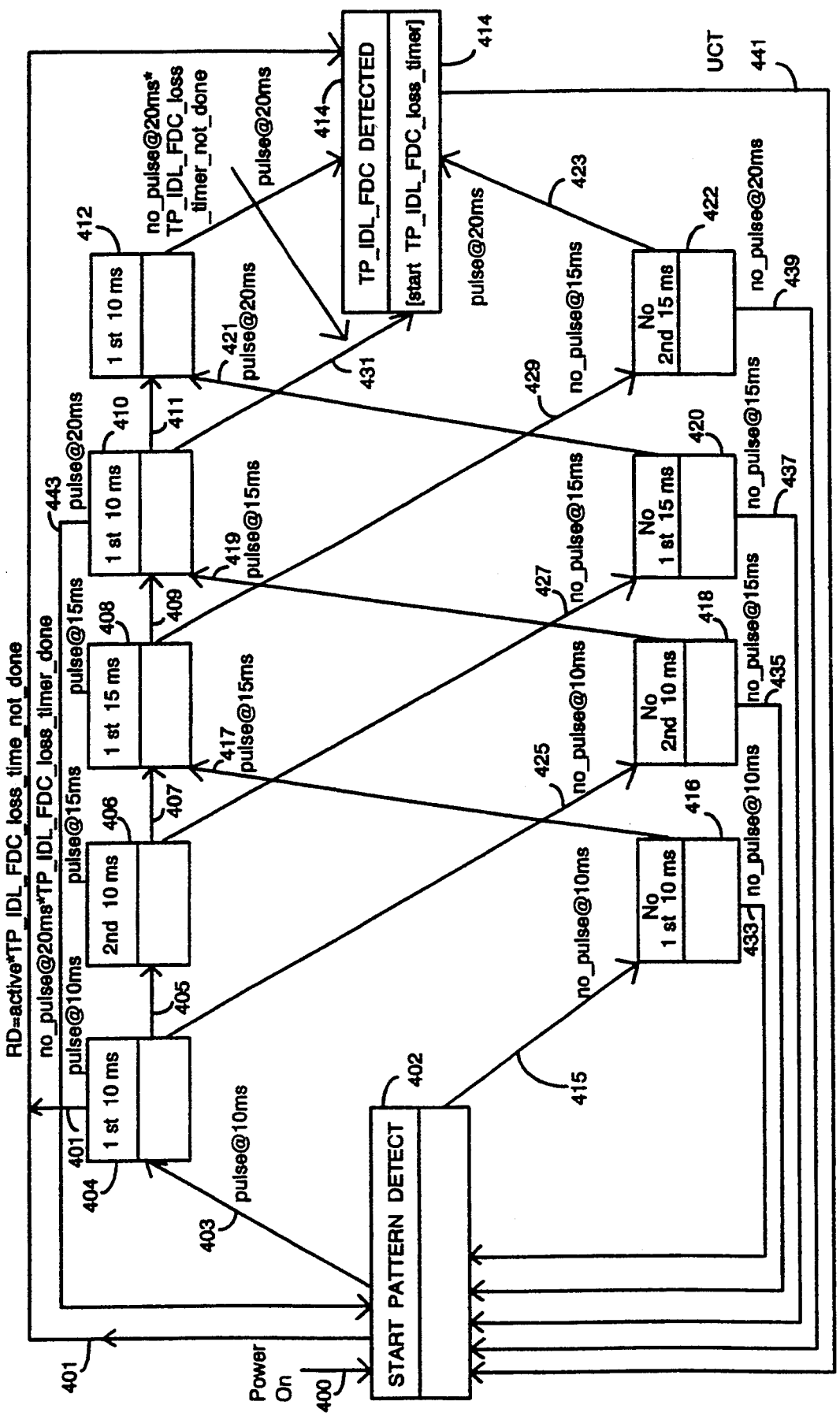
FIG. 7 is an embodiment of a state diagram for determining a pattern of link test pulses.

A separate receive state machine is required for the detection of each pattern. FIG. 7 shows the state diagram for the TP_IDL_FDC pattern detector. Since the TP_IDL_FDM pattern detector is of exactly the same format, with only pattern (timer) order dependencies, the diagram for this is omitted.

Although a pattern generator is also required at the transmit function, this is trivial by comparison and is assumed to be obvious. A fundamental requirement of the approach shown is that the pattern transmission restarts from the beginning whenever packet data has been sent/received or the pattern changes. This makes both the pattern transmitter and detector simpler to implement. For instance, for the TP_IDL_FDC pattern, the repeating sequence is defined as:

space1, pulse, space1, pulse, space2, pulse, space2, pulse, space3, pulse, space3, pulse . . . [repeat]

with the two space1 periods defined as the start of the pattern.

The receive pattern detection is more difficult, since it is required to maintain robustness even if some of the pattern is missing or corrupted. As previously stated, a fundamental tenant of the original 10BASE-T specification was to make the qualification from link fail to link pass stringent, but the qualification to maintain link pass (and not to enter link fail) much less so. This philosophy is continued in the pattern detector described in FIG. 7.

Note that for brevity, the convention used in FIG. 7 is as follows:

pulse@10 ms. Indicates that a link test pulse was detected (link_test_rcv=true) and that this was associated with a nominal 10 ms (space1) timer window, and was not associated with either the 15 ms (space 2) or 20 ms (space 3) nominal timer windows.

no_pulse@10 ms. Indicates that a link test pulse was detected (link_test_rcv=true) and that it was not associated with a nominal 10 ms timer window, although it may have been associated with a different timer window.

From an implementation point, a counter could be sampled (and cleared) on detection of a link pulse. The sampled count would indicate the elapsed time, which would be compared with the nominal time periods acceptable for the three pulse spacing periods, for instance 8–12 ms (nominally 10 ms), 13–17 ms (nominally 15 ms) and 18–22 ms (nominally 20 ms). Since the time periods would be mutually exclusive, two timers could not match a sampled elapsed time.

At Power On 400, the receive pattern detector will enter the Start Pattern Detect state 402, and will wait for the first link test pulse. If receive activity occurs due to packet data, there will be no change of state until the TP_IDL_FDC_loss_timer_not_done condition is true on exit path 401.

Assume first that there is a valid TP_IDL_FDC pulse train received. The state machine will move along the path 403, 404, 405, . . . , 412, 413, 414 in order, entering the TP_IDL_FDC Detect state 414, and starting the TP_IDL_FDC_loss_timer. The unconditional transfer (UCT) 441 will then return the state machine back to the Start Pattern Detect state 402.

All states (except the TP_IDL_FDC Detected state 414) have the exit condition:

RD=active * TP_IDL_FDC_loss_time_not_done although this is only explicitly shown on states 402 and 404 (for reasons of drawing clarity). This means that at any time after the TP_IDL_FDC_loss_timer has been started and is running, receive packet activity will move the state machine to the TP_IDL_FDC Detected state 414, and restart the TP_IDL_FDC_loss_timer. Hence continuous receive packet activity will prevent the timer from timing out, and packet activity received at any point in the pattern (once the TP_IDL_FDC_loss_timer is running) will also restart the timer.

Assume now that a TP_IDL_FDC pattern is received with one link pulse missing, for instance:

space1, pulse, long space, pulse, space2, pulse, space3, pulse, space3, pulse.

Note that in this case only five pulses will be received in the entire sequence.

In this case, the pattern detector will detect space 1 (pulse@10 ms) when the first pulse is received, and move to the 1st 10 ms state 404 via transition 403. The second pulse will be received after approximately 25 ms (second space1 plus first space2), which will meet the no_pulse@10 ms transition 425 and hence move to the No 2nd 10 ms state 418. When the third pulse is received after 15 ms, the transition 419 to the 2nd 15 ms state 410 will be made. Subsequently, two space3 separations will be detected, moving the state machine through the normal path along transition 411 to state 412, and transition 413 to the TP_IDL_FDC Detected state 414.

Any other single missing pulse, including the missing first pulse is handled by this algorithm. One exception is that if the detected pattern does not have the two 20 ms spacings at the end of the pattern, it will not enter the TP_IDL_FDC Detected 414 state via transition 431 if the TP_IDL_FDC_loss_timer is timed out (running). It will instead, take transition 443 back to the Start Pattern Detect state 402. Hence the first pattern must have the two 20 ms spaces, although once the TP_IDL_FDC_loss_timer is running, subsequent patterns need not.

Hence the overall criteria to ensure the initial pattern detection is more stringent than the subsequent pattern detection is maintained, and the requirement that the patterns with lost pulses will meet the pattern detection is also met.

Although the present invention has been described in accordance with the embodiments shown, one of ordinary skill in the art will readily recognize that there could be variations to the embodiments and those variations would be within the spirit and scope of the present invention. For example, although the present invention has been discussed in relationship to full duplex to half duplex detection, one of ordinary skill in the art will readily recognize that for example a speed change could be transmitted and detected, a protocol change could be transmitted and detected, or the like, and those would be within the spirit and scope of the present invention.

In addition, although the present invention has been discussed in the context of a 10BASE-T communications network, the auto negotiation system has been discussed in the context thereof, one of ordinary skill recognizes that this system of the present invention has application to a wide variety of networks. Accordingly, many modifications may be made by one of ordinary skill in the art without departing from the spirit and scope of the appended claims.

What is claimed is:

1. A method for determining whether there are enhanced capabilities between a first and second station within a communications network comprising the steps of:
   providing a specified pattern of link test pulses from the first station, the specified pattern having varying periods of separation between the link test pulses, such that a first period of separation occurs before and after a first predetermined link test pulse, a second period of separation occurs before and after a second predetermined link test pulse, and a third period of separation occurs before and after a third predetermined link test pulse, and indicating that the first station has enhanced capabilities;
   receiving the specified pattern of link test pulses at the second station, the second station then entering an enhanced mode; and
   providing the specified pattern of link test pulses to the first station from the second station, the first station then entering the enhanced mode.

2. A method for determining whether there is half duplex or full duplex capability between two stations within a communications network comprising the steps of:
   providing a specified pattern of link test pulses from a first station, the specified pattern having varying periods of separation between the link test pulses, such that a first period of separation occurs before and after a first predetermined link test pulse, a second period of separation occurs before and after a second predetermined link test pulse, and a third period of separation occurs before and after a third predetermined link test pulse, and indicating that the station is full duplex communication capable but is transmitting in half duplex mode;
   receiving the specified pattern of link test pulses at a second station, the second station then preparing to enter the full duplex mode;
   providing the specified pattern of link test pulses to the first station from the second station, the first station then entering the full duplex mode; and
   providing the specified pattern of link test pulses to the second station, the second station then entering the full duplex mode.

3. The method of claim 2 in which the first and second specified patterns are within a 10BASE-T link test pulse pattern.

4. A system for determining whether there is half duplex or full duplex communication within a communications network comprising:
   a first station transmitting a specified pattern of link test pulses, the specified pattern having varying periods of separation between the link test pulses, such that a first period of separation occurs before and after a first predetermined link test pulse, a second period of separation occurs before and after a second predetermined link test pulse, and a third period of separation occurs before and after a third predetermined link test pulse, and indicating that the station is full duplex communication capable but is transmitting in half duplex mode; and
   a second station receiving the specified pattern of link test pulses, the second station then entering the full duplex mode and providing the specified pattern of link test pulses to the first station, the first station then entering the full duplex mode.

5. A system for determining whether there is a half duplex or full duplex capability between two stations within a communications network comprising:
   a first station providing first and second specified pattern of link test pulses, the first and second specified patterns having varying periods of separation between the link test pulses, the varying periods for the first specified pattern occurring such that a first period of separation occurs before and after a first predetermined link test pulse, a second period of separation occurs before and after a second predetermined link test pulse, and a third period of separation occurs before and after a third predetermined link test pulse, and the varying periods of separation for the second specified pattern occurring such that the first period of separation occurs before and after the first predetermined link test pulse, the third period of separation occurs before and after the second predetermined link test pulse, and the second period of separation occurs before and after the third predetermined link test pulse, the first specified pattern indicating that the first station is in half duplex mode with full duplex capability, the second specified pattern indicating that the first station is in full duplex mode; and a second station receiving the first and second specified patterns of link test pulses and entering full duplex mode, the second station providing the second specified pattern of link test pulses to the first station, the first station then entering the full duplex mode.

6. The system of claim 5 in which the first and second specified patterns are within a 10BASE-T link test pulse pattern.

7. A method for determining whether there is half duplex or full duplex capability between two stations within a communications network comprising the steps of:

providing a first specified pattern of link test pulses from a first station, the first specified pattern having varying periods of separation between the link test pulses such that a first period of separation occurs before and after a first predetermined link test pulse, a second period of separation occurs before and after a second predetermined link test pulse, and a third period of separation occurs before and after a third predetermined link test pulse, and indicating that the first station is in half duplex mode with full duplex capability;

receiving the first specified pattern of link test pulses at a second station, the second station then preparing to enter the full duplex mode;

providing a second specified pattern of link test pulses to the first station from the second station, the first station then entering the full duplex mode;

providing the second specified pattern of link test pulses from the first station, the second specified pattern having varying periods of separation between the link test pulses, such that the first period of separation occurs before and after the first predetermined link test pulse, the third period of separation occurs before and after the second predetermined link test pulse, and the second period of separation occurs before and after the third predetermined link test pulse, and indicating that the first station is in the full duplex mode;

receiving the second specified pattern of link test pulses at the second station, the second station then entering the full duplex mode;

providing a third specified pattern of link test pulses from either one of the first or second stations, the third specified pattern indicating simplex mode only and having each link test pulse separated by the second period of separation; and recognizing the third specified pattern by the other of the first or second stations, the other station then entering the simplex mode.

8. The method of claim 7 which further includes the step of sending the first specified pattern by the other station responsive to the recognizing step.

9. The system of claim 8 in which the first, second and third specified patterns are within a 10BASE-T link test pulse pattern.

10. An apparatus in a station, the station being part of a communications network, the apparatus for determining if other stations on the network include full duplex capability, the apparatus comprising:

means for providing first and second specified patterns of link test pulses, the first and second specified patterns having varying periods of separation between the link test pulses, the varying periods for the first specified pattern occurring such that a first period of separation occurs before and after a first link test pulse, a second period of separation occurs before and after a third link test pulse, and a third period of separation occurs before and after a fifth link test pulse, and the varying periods of separation for the second specified pattern occurring such that the first period of separation occurs before and after the first link test pulse, the third period of separation occurs before and after the third link test pulse, and the second period of separation occurs before and after the fifth link test pulse, the first specified pattern indicating that the first station is in half duplex mode with full duplex capability, the second specified pattern indicating that the first station is in full duplex mode;

means for receiving the first and second specified patterns of link test pulses, upon receipt of the first specified pattern, the station entering full duplex mode;

means for providing a third specified pattern of link test pulses responsive to an external signal, the third specified pattern indicating that the station is in simplex mode only and having each link test pulse separated by the second period of separation;

means for receiving the third specified pattern of link test pulses; and means for recognizing the third specified pattern and entering simplex mode.

11. The apparatus of claim 10 which further includes means for sending the first specified pattern responsive to the recognizing means.

12. The apparatus of claim 10 in which the first, second and third specified patterns are within a 10BASE-T link test pulse pattern.

13. The apparatus of claim 10 which further comprises:

means for forcing the station to full duplex mode responsive to an external signal.

14. The apparatus of claim 13 wherein the external signal is a hard wire input signal.

15. The apparatus of claim 13 wherein the external signal is software programmable.

16. The apparatus of claim 10 which further comprises:

means for forcing the station to half duplex mode responsive to an external signal.

17. The apparatus of claim 16 wherein the external signal is hard wire input signal.

18. The apparatus of claim 16 wherein the external signal is software programmable.

* * * * *